United States Patent
Lugg

(10) Patent No.: US 8,446,060 B1
(45) Date of Patent: May 21, 2013

(54) MAGNETIC ADVANCED GAS-TURBINE TRANSMISSION WITH RADIAL AERO-SEGMENTED NANOMAGNETIC-DRIVE (MAGTRAN)

(76) Inventor: Richard H. Lugg, Falmouth, ME (US)

( * ) Notice: Subject to any disclaimer, the term of this patent is extended or adjusted under 35 U.S.C. 154(b) by 272 days.

(21) Appl. No.: 13/004,698

(22) Filed: Jan. 11, 2011

Related U.S. Application Data

(60) Provisional application No. 61/294,171, filed on Jan. 12, 2010, provisional application No. 61/294,189, filed on Jan. 12, 2010.

(51) Int. Cl.
*H02K 21/12* (2006.01)

(52) U.S. Cl.
USPC ..................... 310/156.22; 310/103

(58) Field of Classification Search
USPC .............. 310/156.22, 103–105, 112–115
See application file for complete search history.

(56) References Cited

U.S. PATENT DOCUMENTS

| | | | | |
|---|---|---|---|---|
| 4,882,509 | A * | 11/1989 | Wottlin | 310/46 |
| 4,896,064 | A * | 1/1990 | Taiani | 310/104 |
| 5,828,148 | A * | 10/1998 | Niggemann et al. | 310/86 |
| 7,279,816 | B2 * | 10/2007 | Oikawa | 310/36 |
| 7,626,297 | B2 * | 12/2009 | Brown | 310/103 |
| 7,804,215 | B2 * | 9/2010 | Hemmelmann et al. | 310/104 |
| 2005/0067909 | A1 * | 3/2005 | Ahn et al. | 310/179 |
| 2007/0186692 | A1 * | 8/2007 | Waszak et al. | 73/862.331 |

* cited by examiner

*Primary Examiner* — Thanh Lam
(74) *Attorney, Agent, or Firm* — Burns & Levinson, LLP; Chris A. Caseiro

(57) ABSTRACT

An electrical machine apparatus having magnetic gearing embedded therein includes a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with the moveable rotor and a second magnetic field through a movable stator, through a plurality of magnetic flux gates arranged axially in the modulator with the field excited by, and controlled by, eddy currents normal to the field through the plurality of stationary stator magnets governed by the position of the modulator rotating in reference to the rotating (at different speeds, hence flux paths) stator and rotor and their magnetic field poles, than the speed of the modulator and its interfering referenced field poles, with the eddy currents existing flux gate arrays with open or closing sequencing governing rotational speeds of the movable rotor, and enabling magnetic gear ratios, in respect to the driving movable stator, intermediate magnetic flux modulator, methods of a continuously variable, high torque, aero gas turbine transmission which allows for complete segmentation of turbomachinary stages (in respect to the bypass fan, compressor and power of the aero gas turbine.

2 Claims, 16 Drawing Sheets

MAGNETIC ADVANCED GAS-TURBINE TRANSMISSION WITH RADIAL AERO-SEGMENTED NANOMAGNETIC-DRIVE (MAGTRAN)

CROSS REFERENCE TO RELATED APPLICATIONS

This application claims priority to the following:

U.S. Provisional Application Ser. No. 61/294,189 filed Jan. 12, 2010, entitled MAGNETICALLY ADVANCED GEARED PROPELLER FOR ROTATIONALLY OPPOSITE PROP-FANS (MAGPROP); and U.S. Provisional Application Ser. No. 61/294,171 filed Jan. 12, 2010, entitled MAGNETIC ADVANCED GAS-TURBINE TRANSMISSION WITH RADIAL AERO-SEGMENTED NANOMAGNETIC-DRIVE (MAGTRAN), the disclosures of which are incorporated herein by this reference in their entirety for all purposes.

FIELD OF THE INVENTION

The disclosed concept relates to aircraft engines, and, more particularly, to a variable magnetic gear transmission.

BACKGROUND

Aero gas turbine engines are very high speed thermodynamic machines burning jet fuel for combustion with the high speed exhaust effluent (2500 to 3000 ft./sec.) impinging on turbine blades, rotating them, and torque transferred with mechanical drive transmissions at the center of the engine, defined as several shafts or spools, running one inside the other. No design nor innovation has been conducted on utilizing knowledge and the art of magnetic transmissions that operate at high speed to benefit the efficiency of aero gas turbine engines or differing power propulsion architecture. The requirements to segment rotating machinery in order to provide a multitude of gearing, or gear ratios to extract 100% efficiency from a rotating machine (electrical or otherwise), in particular a aero gas turbine engine machines which have broad need for improvement of thermodynamic and aerodynamic efficiencies, this has not been done before.

The topology today of mechanically linked gas turbines to connect the bypass fan to compressor to the power turbine is very limited as all the stages of the compressor are connected together to one spool or more which is connected to the power turbine, hence driving the compressor. If the stages of the bypass fan and compressor could be individually segmented from each other, and subsequently from the power turbine, and the power turbine stages segmented also, dramatic increases in thrust and efficiency are possible, as then all the desired stages of the gas turbine can be run at the optimal speed for mass flow air velocity, temperature, air density (altitude) and flight Mach number.

There have been numerous investigations on analysis and scaling of electrical machines as it relates to DC synchronous permanent magnet motors and generators, but little to no analysis or criteria for defining architectures and topology of electrical machines known as magnetic gears or magnetic transmissions. The analysis of magnetic force and torque density has been addressed by a number of investigators, but very little on high speed transmission machines has been conducted, and almost the complete lack of this type of analysis, and hence promotion of control technologies does not exist.

Initially, papers have focused mainly on the calculation of the torque as the output of a rotating body in electrical machines, but nothing as with a stator and a rotor in an aero gas turbine. In the past researchers have drawn comparisons on several different methods to calculate the torque density and transmission of power. These efforts resulted in torque density calculation at several different locations along the baseline of an experimental three-phase stator and rotor permanent magnet synchronous electrical machine demonstrating a quasi-static magnetic field for example, but this was not a high speed machine nor had the need for a variable torque in moderating the transfer of power. No application has ever been done in defining innovative topologies for an electromagnetic segmented high torque density aero gas turbine engine transmission, nor defining operability requirements which drive design and topology of the electromagnetic structures.

The problem of magnetically generated vibrations is known and been discussed in research with comprehensive analysis. These vibrations can disrupt the magnetic fields generated, and exist in simple machine architectures using permanent magnets in the rotor and induction coils in the stator, being addressed in numerous cases. In high power density electrical permanent magnet machines, particularly with innovative architectures to increase torque density through volume and surface area, these magnetic phenomena have to be addressed more so when there is the requirement of a multitude of generated magnetic fields and individual torque densities must be maintained and controlled stage to stage in line down the length of a magnetic transmission.

Since the magnetic force increases approximately with the square of magnetic flux, the forces arising from machine designs, motors, generators or gear magnetic transmissions, using rare earth magnets are significantly greater than those from conventional magnet designs. Vibration problems are particularly serious in the machine transmission design when the forcing frequencies match one or more of the structural resonant frequencies in the machine.

Accordingly, a need exists for a very high torque density magnetic topology which will reduce structural resonant frequencies at high revolutionary speeds and address the manipulation of magnetic flux, its direction and magnitude across the air gap and utilize the power of eddy current forces to control transmission ratio.

SUMMARY OF INVENTION

Disclosed is a magnetic advanced gas-turbine transmission with radial aero nanomagnetic-drive (MAGTRAN), in which some, or all of the turbomachine rotors containing turbomachinery (aerodynamic vanes or airfoils for thrust, compression and/or air flow velocity control and expansion) are uncoupled mechanically, and are coupled instead electromagnetically, allowing the turbomachinery components to rotate at different speeds and in different directions, and at the exact optimal speed at any given time, for a given flight condition. Rotational forces are provided by magnetic fields of high strength and torque density, and magnetic flux, from permanent magnets and electromagnets in axial and radial architectures. Such magnetic transmission topology is as strong, or stronger, than mechanical spooled systems in gas turbine engines. In a turbine implementation, the power generated in the turbine is provided to the compressor, fan, and auxiliary systems via a magnetic drive train in which the torque to each component is transmitted with magnetic fields instead of through direct mechanical attachments. Additionally, the electromagnetic topology of the MAGTRAN apparatus, lends itself to one or more architectures incorporating integrated electromagnetic, high energy density, radial or linear superconducting or permanent magnet, synchronous, or non-synchronous electric power generators, either at the engine core of the topology of MAGTRAN, or at the perimeter at the exo-skeleton outer casing. In this way, each turbomachine stage can be operated at the exact ideal operating condition, and simultaneously generate electric power for aircraft auxiliary systems, or powerful enough for laser weapons systems, both directed energy and microwave emitting transmitters, individually unto themselves, and in relation to the other turbomachinery components in each area of the gas turbine; bypass fan, compressor and power turbine. The disclosed engine uses far fewer blade rows and is more efficient at a wide range of operating conditions. The configuration also enables certain desirable engine configurations which are not practical in a conventional gas-turbine. These include a highly variable non-Brayton electric aero gas turbine engine cycle, and ultra-high bypass configurations and hybrid distributed aero propulsion engines whereby the engine core is separated from the bypass fans and auxiliary electric generation machinery.

Magnetic force analysis is important in understanding the benefit and operation of the MAGTRAN apparatus, an electromagnetic, segmented aero gas turbine transmission. The purpose is not only to determine the torque as the output of the electromagnetic transmission, but also to determine an appropriate control circuit and containing numerical analysis which derives the magnetic control of the normal eddy current flux to the major magnetic flux drive between the SHTPMA and the RTTPMA. Neodymium permanent magnets and other rare earths have great retentivity, coercive force and maximum energy product than traditional ferrite magnets and are used in the MAGTRAN apparatus so as to optimize magnetic density. These magnetic materials are utilized in the electromagnetic segmented pole pieces of the SHTPMA, RTTPMA and IDMM of the aero gas turbine transmission.

An electromagnetic segmented gas turbine engine transmission whereby each stage of the bypass fan, low pressure compressor, high pressure compressor, low pressure power turbine, and high pressure turbine are segmented from each other running at their own optimal design point speeds to maximize engine performance via combustion and thrust, and that each respective stage within the bypass fan, compressor and power turbine is segmented from each other, and may all, if not some, counter rotate to one another to maximize thermodynamic extraction of the kinetic energy generated from combusting fuel in the aero gas turbine. $Nd_2Fe_{14}B$ plastic bonded magnet segments are used with a high pressure SIP technique to inject and mould to the exact shape necessary, into a magnetic shaft running through an aero gas turbine engine, and are magnetized and thus assembled in such a topology and arrangement to form magnetic multipole gear couplings and an entire electromagnetic transmission for the aero gas turbine engine, without mechanical contact or linkage, for all the bypass fan, compressor and power turbine stages, and all the individual stages separately within each of these aero gas turbine engine section architectures. Magnetic load carrying capacity and measurements of these capacities may be performed using various numbers of magnetic poles, the geometries, load sensors, and various separation distances between the magnetic pole gears. The transmitted torque behavior of the MAGTRAN apparatus, an electromagnetic aero gas turbine transmission is so associated with the configuration of the magnitude field distribution between the multiple poles arranged in stator, rotor and intermodular pole architectures so as to be one in the same with each rotating turbomachinery segment or stage. The transmitted torque behavior of MAGTRAN apparatus, an electromagnetic aero gas turbine transmission is so associated with the configuration of the magnetic field distribution between the multiple poles arranged in rotor, stator and intermodular magnetic architectures so as to be one in the same with the rotating turbomachinery.

The generation and management of these multiple magnetic fields and the vibrations must be addressed more so during high speed operations so as not to interfere with the requirement to deliver high torque density, large magnetic fields to transmit power in high speed operations such as in a magnetically segmented aero gas turbine engine, as in MAG-JET (see International Appl. No. PCT/US09/54317). In the disclosed MAGTRAN apparatus, the use of electric coil control circuits at flux gates between an intermodular rotating pole array (IDMM) between the rotating stator and rotor, to control the flow of natural eddy currents, normal to the field of the major magnetic flux drivers in SHTPMA and RTTPMA, is a design approach also which controls vibration and frequency concerns in the MAGTRAN machine.

According to one aspect of the disclosure, an electrical machine apparatus comprises: A) a moveable rotor having a first magnetic field associated therewith; a stator configured with a plurality of stationary stator windings therein; and B) a magnetic flux modulator interposed between the moveable rotor and the stator windings, wherein the magnetic flux modulator is configured to transmit torque between the first magnetic field associated with the moveable rotor and a second magnetic field through the movable stator. In one embodiment, the magnetic flux modulator comprises a plurality of axially arranged magnetic flux gates with their magnetic field excitable by, and controllable by, eddy currents normal to the field through the plurality of stationary stator magnets as governed by a position of the magnetic flux modulator rotating relative to the stator and movable rotor.

BRIEF DESCRIPTION OF THE DRAWING

The above and further advantages of the invention may be better understood by referring to the following description in conjunction with the accompanying drawings in which.

DETAILED DESCRIPTION

An electrical machine apparatus having magnetic gearing embedded therein includes a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with the moveable rotor and a second magnetic field through a movable stator, through a plurality of magnetic flux gates arranged axially in the modulator with the field excited by, and controlled by, eddy currents normal to the field through the plurality of stationary stator magnets governed by the position of the modulator rotating in reference to the rotating (at different speeds, hence flux paths) stator and rotor and their magnetic field poles, than the speed of the modulator and its interfering referenced field poles, with the eddy currents existing flux gate arrays with open or closing sequencing governing rotational speeds of the movable rotor, and enabling magnetic gear ratios, in respect to the driving movable stator, intermediate magnetic flux modulator, methods of a continuously variable, high torque, aero gas turbine transmission which allows for complete segmentation of turbomachinary stages (in respect to the bypass fan, compressor and power of the aero gas turbine.

Topology on Aero Gas Turbine Magnetic Transmission Design

Figure 4:
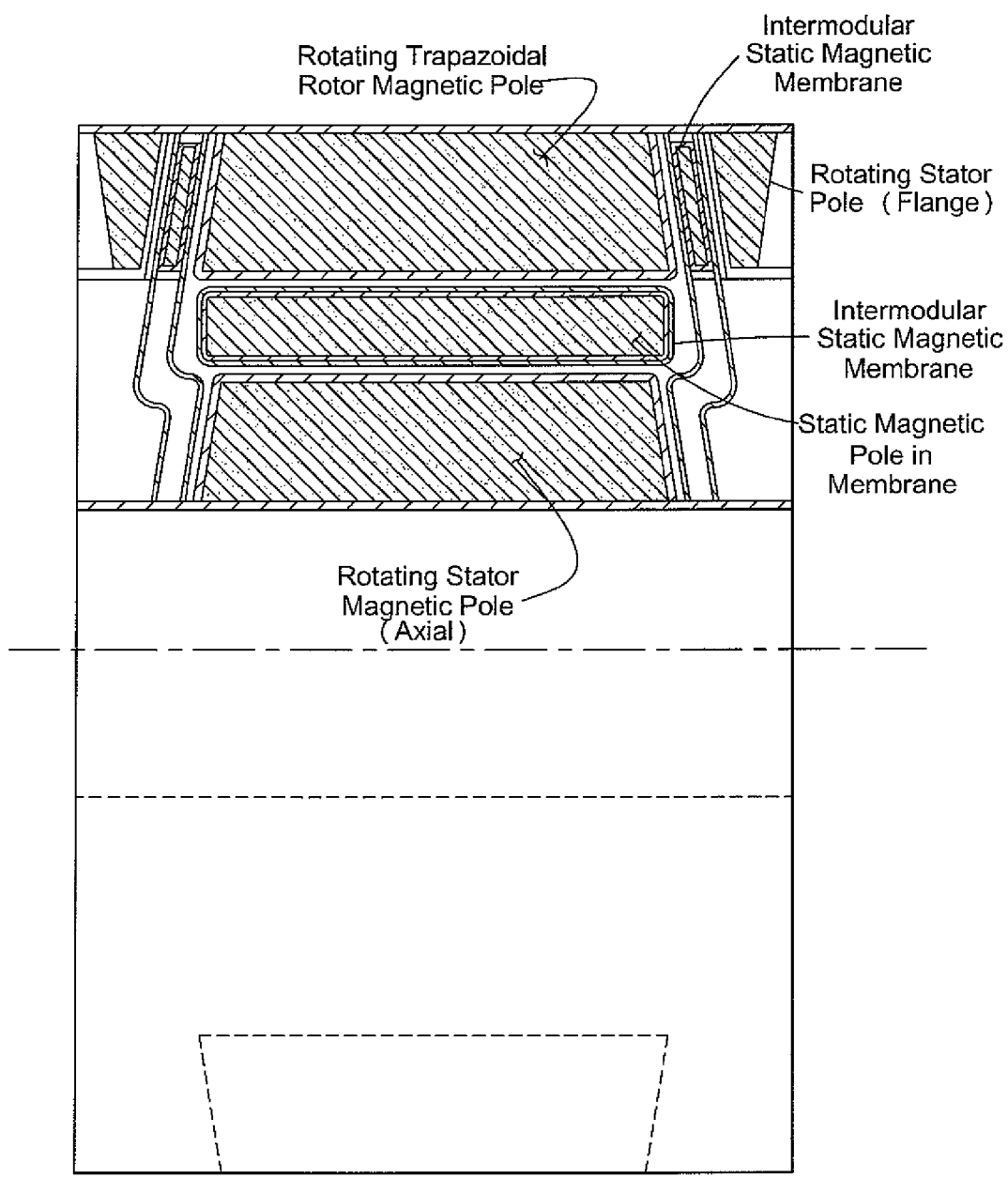
FIG. 4 is a conceptual side, cross-sectional view of the engine of FIGS. 1-3.

An external gear transmission formed by pairs of cylindrical sintered NdFeB moldable high temperature magnets, above and below each other in a hub and flange configuration (pole surface area interface drives the magnetic flux interface to increase torque density) are magnetized along the radial direction. The magnetic pole number of each cylindrical magnet is even. Circumferential length of each magnetic pole is equal. These make the driver (stator) able to perform the given train ratio with the help of magnetic force upon the driver (rotor). The two separated radial polarized cylindrical magnets constrain to rotate about their respective axes. The permanent magnetic gears are magnetically coupled to one another, and when the primary driver rotates (stator), it imparts a torque to the follower (rotor), through a magnetic modulator as a magnetic ratio adjustment mechanism, and causes it (the follower or rotor) to rotate. FIG. 4 is a diagram of the magnetic figure of the MAGTRAN transmission that is created by using magnetic poles interspersed with non-magnetic bolted locking joiners. The diagram of FIG. 4, is a novel approach to the MAGTRAN aero gas turbine turbomachinery topology, with a pairs of normal magnet gear arrays, where mechanical teeth do not exist.

Numerous arrangements are possible for magnetic torque transmissions between rotating members which are not mechanically coupled, this is particularly in the case of an aero gas turbine transmission such as in the novel aerodynamic architecture and magnetic topology of MAGTRAN. Most designs known in the art use a plurality of permanent magnets, of specific geometry, arranged around the circumferences of co-axial rotating shafts. These designs typically have stationary poles arranged in an annular configuration between the rotating components. This layout provides a fixed "gear-ratio" between the driving shaft and the driving rotating component. More advanced variations on this basic concept allow for continuously variable gear-ratios. For the purposes of the MAGTRAN apparatus its unique topology involves multiple continuously variable gear-ratios at each turbomachinery stage segment, not just one fixed set of poles on the stator, and a rotating set of poles on the rotor, but with all sets of poles rotating, including an intermodular set of magnetic poles in between the rotating stator, counter-rotating rotor in an ideal MAGTRAN topology, which controls flux and magnitude of generated eddy currents, normal to the path of flux between the stator and rotor, which act as the transmission ratio controller of each ratio stage, and also in some cases, all poles are rotating in opposite directions to one another to control torque, magnetic flux growth and decay against angular offset (maximum and minimum geometric degree points determining maximum flux moments of magnetic torque density during rotation) which ultimately manages the magnetic drag from eddy currents which controls the MAGTRAN transmission ratios, dependent upon the speeds between the stator and rotor poles. they are acting upon. Furthermore, no magnetic drag of the eddy current flow flux, normal to the main flow path of the magnetic flux driving the main gears (stator and rotor) can provide simultaneously variable and fixed magnetic gear ratios. The MAGTRAN magnetic gear ratios from stage to stage are controlled electromagnetically by an open loop coil excitation electric circuit for each individual turbomachinery stage segment, coupled in relationship for operation through a central processor and central computer, this depicted in a schematic, FIG. 17. The electronic central control circuit for eddy current flow is located at or near one of the shear gaps of the flux gates by which eddy current flow exits, and may or may not impart a magnetic drag braking effect upon the rotor from the intermodular magnetic poles at which the flux gates and electronic circuit are adjacent to, this dependent upon electric circuit current, its magnitude and direction through the controlling coil next to the flux gate path. Analysis of the control process of the open loop electronic circuit is defined numerically in a constraining integral equation, Equation 25, with algebraic polynomial boundary conditions which define the angular onset and decay of flux controlling the variable speed transmission through eddy currents. However, any configuration which enabled the various aero gas turbomachines to be decoupled and coupled magnetically to operate independently could be used (including fixed gear-ratio designs or designs with significantly different topology) and the associated topologies to do this.

For a given electromagnetic transmission design the power output from the shaft to the rotating turbomachinery shaft is related to the main design parameters of the synchronous electromagnetic permanent magnet rotating assembly and the equation representing it. The mathematical model of its torque is constructed based on the equivalent magnetic charge principle, and the controlling circuit to the normal flux flow of eddy currents which is based on Faraday's Law, and resulting change in magnetic flux with induced EMF; and Lenz's Law where eddy currents are induced and their magnetic field interacts with the external magnetic field from the main magnets from stator to rotor. Magnetic torque is calculated on these parameters of axial height, circuit distribution of permanent magnet, air gap of active and passive magnetic pole, and a flux leakage coefficient. Magnetic force is varied with these parameters changed. The result shows axial magnetic torque can be increased by increasing the density of magnetic distribution and decreasing active and passive air gap resistance or attraction.

In magnetic electrical machines that operate by hysteresis, the amount of magnetic field penetrating the weaker magnetic material can be varied by constructing the coupling with stronger magnets on opposite sides of the weaker material. The strong magnets are arranged such that one set can be moved relative to the other.

When like poles face each other, they produce maximum magnetic saturation, forcing lines of flux to travel circumferentially through what is termed in MAGTRAN as a pseudo-hysteresis, eddy-current process, through an intermodular dynamic magnetic membrane (IDMM) disc, from the statro hub trapezoidal permanent magnet arrays (SHTPMA) and rotor trunion trapezoidal permanent magnet arrays (RT-TPMA), for maximum torque. When opposite poles face each other they produce minimum saturation of the hysteresis disc, since the lines of flux travel right through it. A combination of adjustment angles between these two extremes gives infinite adjustability in terms of magnetic transmission ratio between SHTPMA and RTTPMA. MAGTRAN topology has a continuously variable gear-ratio, which is controlled by the magnetic drag, or no magnetic drag of the pseudo-hysteresis eddy current flow-flux (as governed by the open loop electronic coil excitation circuit), normal to the main flow path of the magnetic flux driving the main gears passing through the circumferential flux-path gaps between the IDMM and the RTTPMA. Pure eddy-current drives transmit torque by changing the distance between the conductors and drive magnets, but no pseudo-hysteresis, eddy current control process is known in the art of magnetic transmissions to provide infinite ratio control.

The pseudo-hysteresis, eddy-current drive in MAGTRAN, in its topology, has a continuously variable gear-ratio through manipulation via an electromagnetic open loop controller circuit, of the normal flux paths, through flux gates, which become aligned, or not aligned with similar, or dissimilar North and South magnetic poles between the slowly rotating IDMM di-pole in-between the high speed SHTPMA stator, and the low speed RTTPMA rotor. This becomes impinged upon by the magnetic drag of the eddy currents flowing through the IDMM normal to the main magnetic fields engaging the SHTPMA and the RTTPMA, or no magnetic drag of the eddy current flow flux, normal to the main flow path of the magnetic flux driving the main gears, the magnetic drag slows or speeds up the RTTPMA hence varying the ratio speeds of the permanent magnet poles of the SHTPMA stator and the RTTPMA rotor. The open loop electric coil excitation circuit is defined numerically in a constraining integral equation with algebraic polynomial boundary conditions defining the angular onset and decay of flux controlling the variable speed transmission. This is defined numerically in a constraining integral equation with algebraic polynomial boundary conditions, defining the angular onset and decay of magnetic flux from the eddy current flow path through the flux gates and thereby controlling the variable speed transmission.

Alternately, one or two sets of strong magnets can be moved away from the weaker material (for less overlap or increased air gap) to vary the amount of torque transmitted. Because there are no contacting surfaces, the setting can be maintained indefinitely. Once it is set, this torque does not change. Continuous slip within operational parameters do heat the clutch but does not change its torque or necessitate resetting as with wearing friction, wrap spring, or ball detent types.

In MAGTRAN hybrid hysteresis eddy-current control is derived in the topology by a make up magnets that keep their properties constant over an expected temperature range. The circumferential oriented magnet design is characterized by a non-magnetic rotor core with alternating circumferential oriented permanent magnets and iron rotor pole pieces around the outside of the rotor core. The stator is the same as in the radial-oriented magnet design. In this circumferential arrangement, two permanent magnets act together to supply the air gap flux whereby high air gap flux densities can be obtained for the deep magnet configurations. With the magnetic shear stress and the amount of torque density proportional to the air gap flux density a smaller more dense magnetic transmission is possible.

Force and Torque of Electromagnetic Aero Gas Turbine Transmissions

Magnetic Forces:

The magnetic field generated by the rotating magnetic shaft (stator) and rotors is governed by a set of Maxwell's equations. With the axial length of each segmented rotating turbomachinery component (bypass fan, compressor or turbine) of each magnetic transmission segment being far lesser than the dimensions in the cross-section plane (magnetic transmission shaft is hollow and of large diameter for cooling), the magnetic field is assumed to be a 3-D field. When the axial length of a magnetic turbine gear segment is far greater than the dimensions of that segment in the cross-section plane, then it is a 2-D field. With the introduction of the scalar potential into a Maxwell equation, and with some mathematics, a single partial differential equation for the scalar potential is yielded:

$$\nabla^T \mu \nabla \phi - \nabla^T \mu H_s = 0s \qquad 1.)$$

Figure 1:
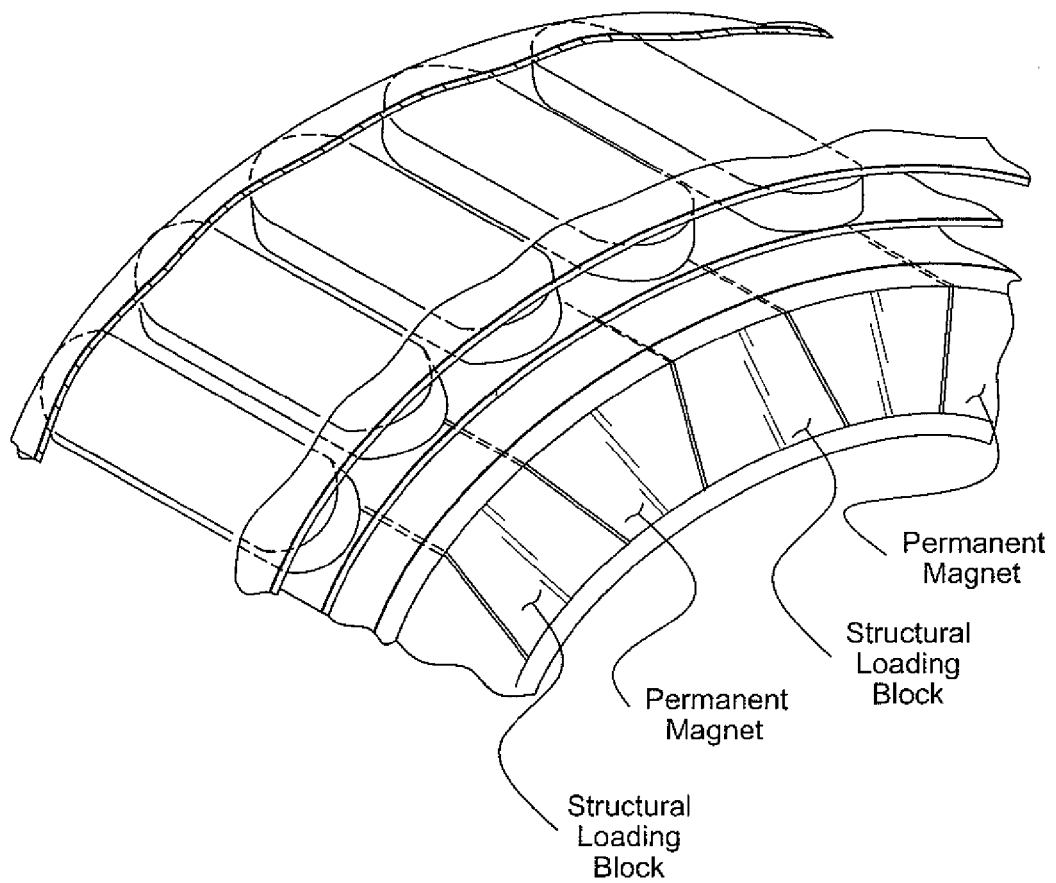
FIG. 1 is a conceptual, conceptual, partially transparent perspective view of an engine illustrating the alternating pattern of trapezoidally shaped permanent magnets and structural loading blocks relative to the hollow engine shaft core and inter-modular static magnetic membrane in accordance with the disclosure.
Figure 2:
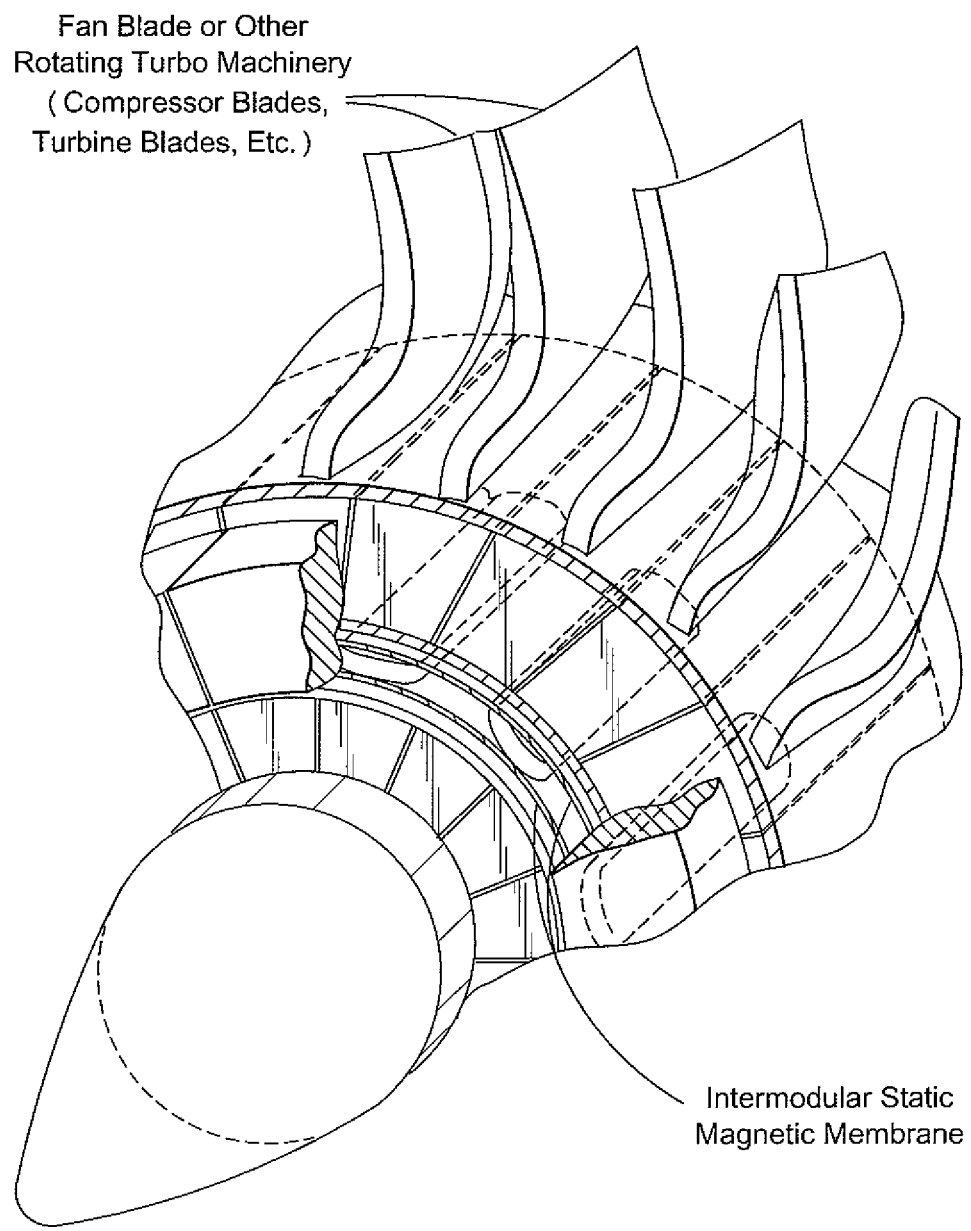
FIG. 2 is a conceptual, partially transparent perspective view of inter-modular static magnetic membrane relative to the hollow engine core and fan blades or rotating turbomachinery in accordance with the disclosure.
Figure 3:
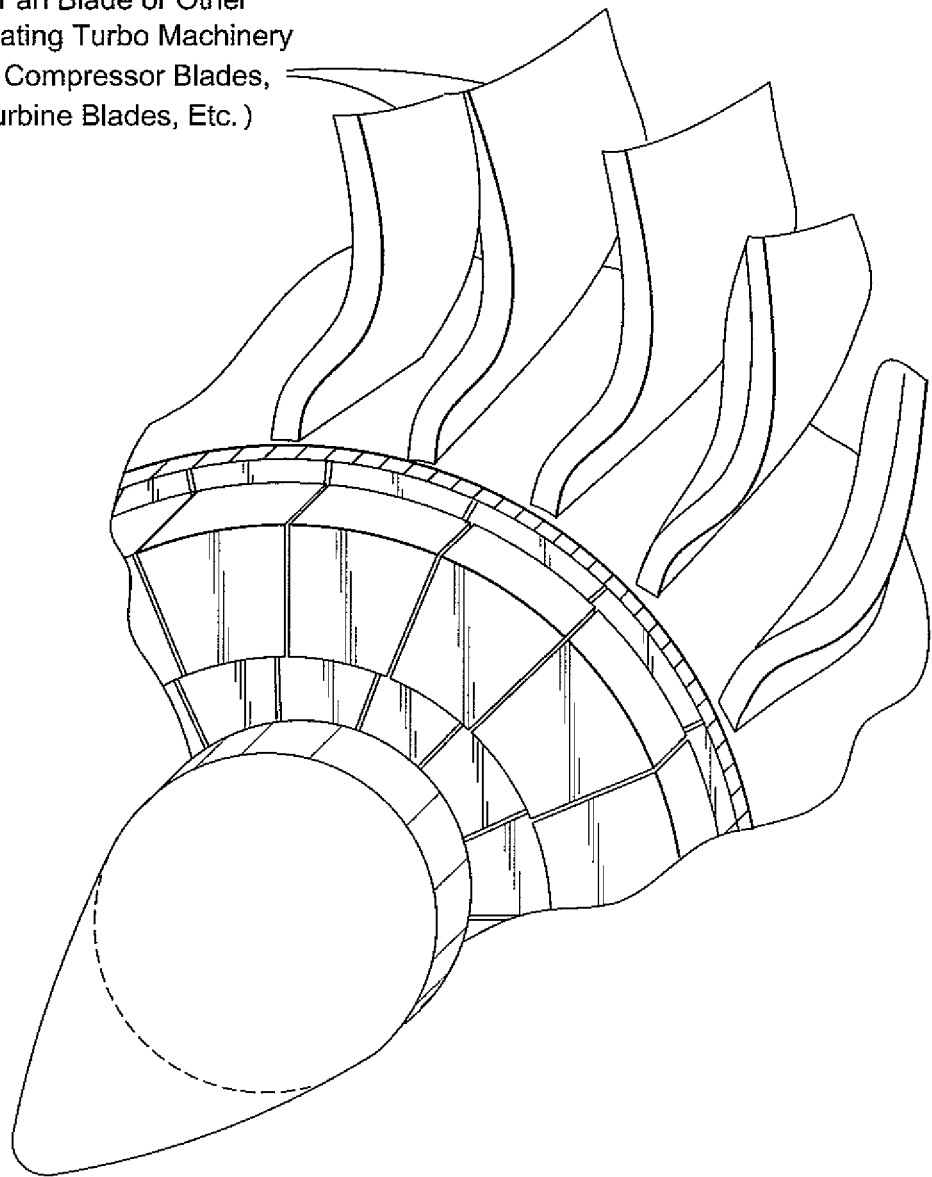
FIG. 3 is a conceptual, partially transparent perspective view of the engine of FIGS. 1-2 illustrating the cross sectional arrangement of permanent magnets in the axle hub in accordance with the disclosure.

The field intensity due to the repulsion flux effects of opposing poles (North and South) or attraction effects of similar poles (South/South or North/North) of the permanent magnets, and at any given time the angular velocity of the faces passing one another, and hence the angular offset can be calculated directly by the Biot-Savart law and magnetic dipole moment per unit volume, respectively. To maximize volume and drive field intensity to high levels of the magnetic advanced gas-turbine transmission with radial aero nanomagnetic-drive (MAGTRAN), an innovative rotor (RTTPMA) architecture and receiving stator (SHTPMA) architecture with an intermodular dynamic magnetic membrane (IDMM) consisting of eight (8) pole pairs (FIG. 1) is utilized. Alternating trapezoidal moldable NdFeB permanent magnets are utilized which run along the Z axis of the magnetic shaft and spread in the x and y direction, however what is unique is that in order to increase magnetic volume, field intensity and torque density, they fold around the outer edges of the bypass fan blade flanges for example, and trunion (FIG. 2) and pass radially in the X direction out toward the fan blade, as in the petal of a flower (FIG. 3). The derived equation is solved using finite element method with an FEM solver for magnetic field intensity H. A non-uniform distributed magnetic force per unit area at the interface between the stator trapezoidal PMs (SHTPMA), and the intermodular dynamic magnetic membrane (IDMM), and then between the intermodular dynamic magnetic membrane (IDMM) and the rotor trapezoidal PMs (RTTPMA) is defined using the Maxwell Stress tensor. Since the strain imposed on the material is due to a nano-magnetostriction that is so small, it is small enough to neglect changes in the torques density. Therefore it can be assumed that the change of flux permeability is negligible. Thus in tensor notation we have a defining nanomagnetic drive and it is obtained that:

$$\sigma ij = 1/\mu(B_i B_j - 1/2\sigma ij B_k B_k) \quad\quad 2.)$$

Where $\Box ij$ is the Maxwell stress tensor, i B is the magnetic flux density which is obtained by the multiplication of permeability to the magnetic flux density across the stator to the intermodular dynamic magnetic membrane, and then to the rotor (rotating turbomachinery component, i.e. dual, counter rotating turbofan). For an interface between two materials a and b, the magnetic traction or torque density is given by if, this formats the following equation given by:

$$fi = (\sigma ij^a - \sigma ij^b) nj \quad\quad 3.)$$

The calculation is based on a magnetization process in which the magnetic interaction among different regions in the PM topology is assumed to be negligible. The magnetic field dependence of each Fourier component of the torque curve may be expressed by a polynomial form of the inverse function of the magnetic field, and the coefficient of each term is determined. The normal (Y direction) and the magnetic traction, or torque density tangential (tangent to the X direction) can be decomposed as follows:

$$fn = (\sigma ij^a - \sigma ij^b) ninj \quad\quad 4.)$$

Since air iron $\Box$, the torque density can be simplified with the introduction of the cylindrical coordinate on the rotor (RTTPMA), then along the air gap, the normal and the tangential torque density (magnetic traction) for the rotor surface face is described by the next Fourier component as it relates to the torque curve where:

$$ft = \sqrt{|fi|^2 - |fn|^2} = |n \times f \times n| \quad\quad 5.)$$

Since m air<</nxf/iron (m, the magnetic torque can be simplified with the introduction of the cylindrical coordinate on the rotor) and on examining the air gap and definition thereof, the normal and the tangential torque for the gear interface can be calculated. Along the air gap, the normal and the tangential traction for the stator face in relation to the rotor is as follows:

$$fr = \sigma rr^a = 1/\mu air (Br^2 - B\theta^2 - B_2^2) \quad\quad 6.)$$

and $$f\theta = \sigma r\theta a = 1/\mu air (B_r - B\theta) \quad\quad 7.)$$

The torque produced for one position of the rotor against the stator, interacting through the magnified field at the interface with the intermodular dynamic magnetic membrane, between the SHTPMA and RTTPMA, at any given point in time is derived from the integration of the shear force along the small air gap. This is exemplified in FIG. 9. For the circumferential face of the rotor of the magnetic transmission in the aero gas turbine, which is perpendicular to the air gap, the normal and the tangential traction have the following form:

$$f\theta = \sigma\theta\theta a = 1/B\theta^2 - B_r^2 - B_2^2 (2\mu air) \quad\quad 8.)$$

and $$f\theta = \sigma\theta\theta a = (1/2\mu air)(B_r^2 - B\theta^2 - B_2^2) \quad\quad 9.)$$

The field distribution inside a closed surface in air remains unchanged if the external sources are removed and replaced by currents and poles sources on the surface which is expressed in the next following equation:

$$T = +\int R \times f\theta d\Omega \quad\quad 10.)$$

Analysis of Geometry and Magnetic Topology

To improve the utilization of magnetic power and torque density, $T_d$ of the motor (FIG. 6), details an exemplary shaped permanent magnet and respective pole(s) array used in the circumferential-oriented, hub and flange, magnetic shaft design of MAGTRAN. The figure represents a single-stage segment, typical of the bypass fan, compressor, or the turbine stage in MAGTRAN. The bypass fan topology, because of the larger diameter, lower RPM and higher torque loading for a super-efficient aero gas turbine with very high bypass ratios, and with counter rotating magnetic transmission segments for a counter-rotating bypass fan architecture, as compared to the compressor section, or turbine section, would have represented larger and taller pole flanges in the x-direction, and longer axially hub poles in the z-direction. Specifically, MAGTRAN involves permanent magnets shaped as quadrilateral or trapezoid geometries to maximize torque density from the rotor trunion trapezoidal permanent magnets, with the longer side dimension on the rotor shaft side of the magnetic transmission (as opposed to the stator side).

Figure 5:
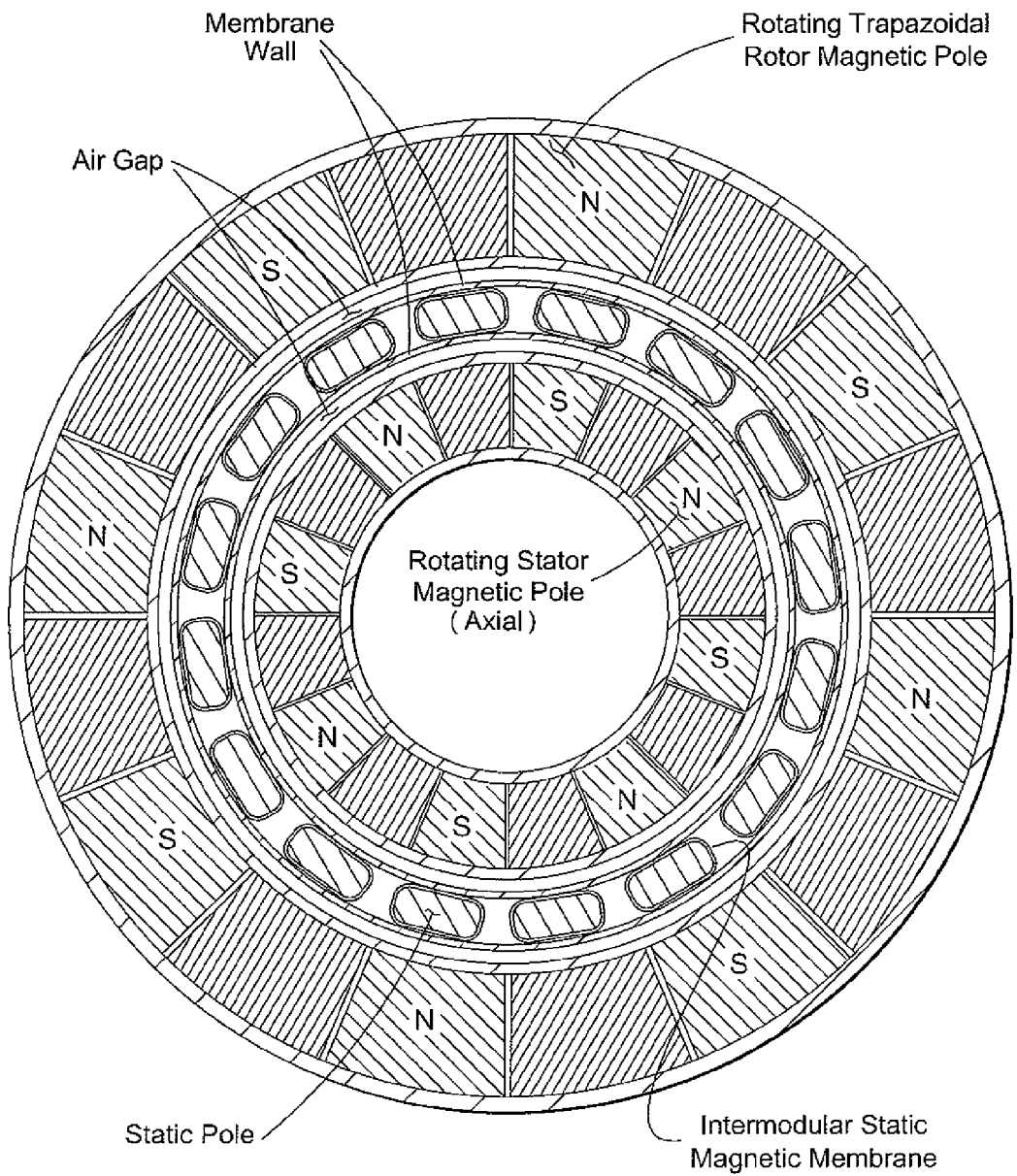
FIG. 5 is a conceptual front, cross-sectional view of the engine of FIGS. 1-3 as referenced to the corresponding elements of FIG. 4.

By alternating trapezoidal permanent magnets and magnet pole pieces, there is better utilization of space in the MAGTRAN design where volume constraints are critical to ensure a very efficient aerothermodynamic machine. Specifically, there is a higher intensity magnetic field created in the air gap utilizing the same radial space in MAGTRAN without altering space or volume of the machine. In essence, relatively unused rotor material in the rotor pole is replaced with flux producing permanent magnets. To improve this utilization and thus improve the torque density $T_d$ of the magnetic transmission FIG. 5 details an exemplary array of trapezoidal shaped permanent magnets in the rotor. To be used in the circumferential oriented geometry of MAGTRAN, permanent magnets involved are shaped as quadrilaterals or trapezoids with longer side dimensions on the rotor shaft side as compared to the stator shaft side. By shaping the permanent magnets in such a manner, under-utilized pole iron from the lower part of the pole piece is replaced with magnetic material in the permanent magnet, thus increasing the effective length, "l" of the permanent magnets, and this moves toward the maximization of the flux capacity and the effective use of nanomagnetic eddy drive flux to control varying magnetic transmission ratios for each turbine segment through an effective magnetic braking or speeding up of the rotor (RTTPMA), in respect to the stator (SHTPMA), through the intermodular pole piece membrane (IDMM).

Torque Analysis Characteristics

The transmitted torque of the MAGTRAN is a function of several variables. This includes the number of magnetic pole pairs, the dimensions of the magnets and their relation to back iron, the air gap between two magnetic gears (or poles) of each MAGTRAN turbine component segment, the thickness of the yoke, the desired varying transmission ratio (top end and low end), and the relative angular offset occurring form ratio t ratio of the stator and the rotor of each turbine segment.

In order to analyze the magnetic field and calculate the torque, the geometry and materials are known and are accurately represented in the analysis model. In the initial analysis of a single turbine nanomagnetic drive segment the relative permeability of NdFeB permanent magnets is considered "1" in all directions and its coercive force is assumed at a specific magnetized direction. The relative permeability of air is also considered "1" in all directions. The iron for the inner ring of magnetic transmission (stator-at the shaft core) is represented by a non-linear function, with the torque computed on the driven gear or armature (rotor) to which a turbomachinery bypass fan, compressor or turbine blade is attached along with the following of a plurality of blades.

Figure 6:
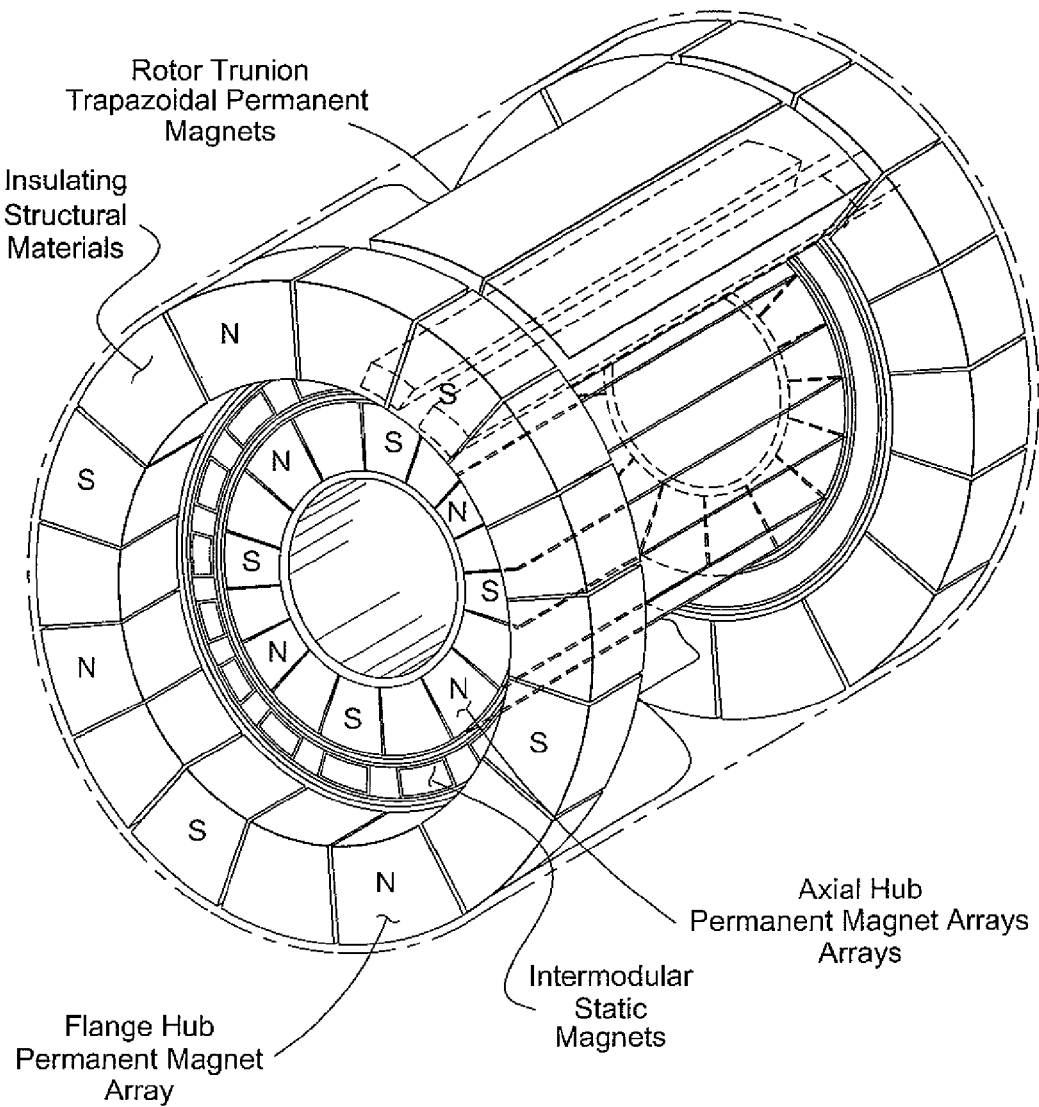
FIG. 6 is a conceptual perspective view of a single stage stator drive gear array with permanent magnet structure topology.
Figure 7:
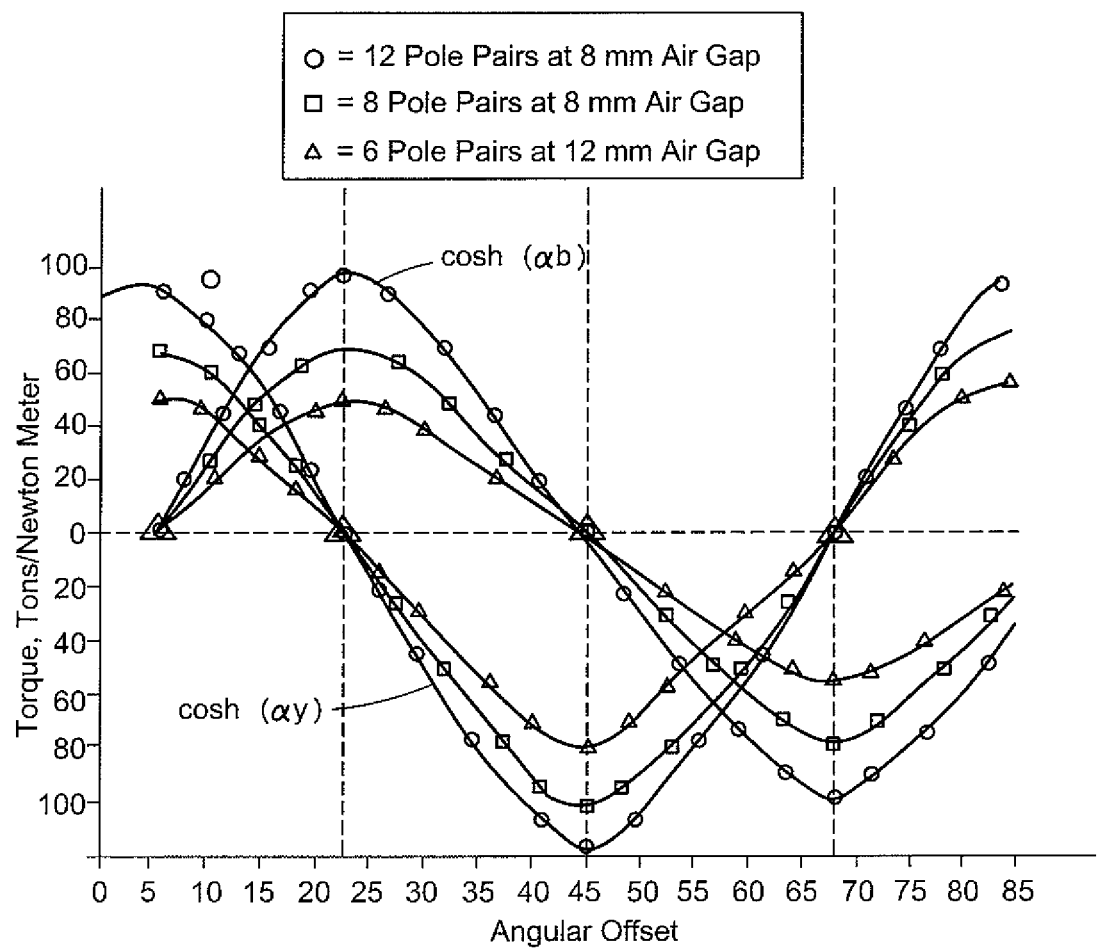
FIG. 7 is a graph illustrating the torque transmitted by the magnetic shaft and its constituent axial and flange hub magnetic arrays decreases quickly as the air gap between two gears is increased.
Figure 8:
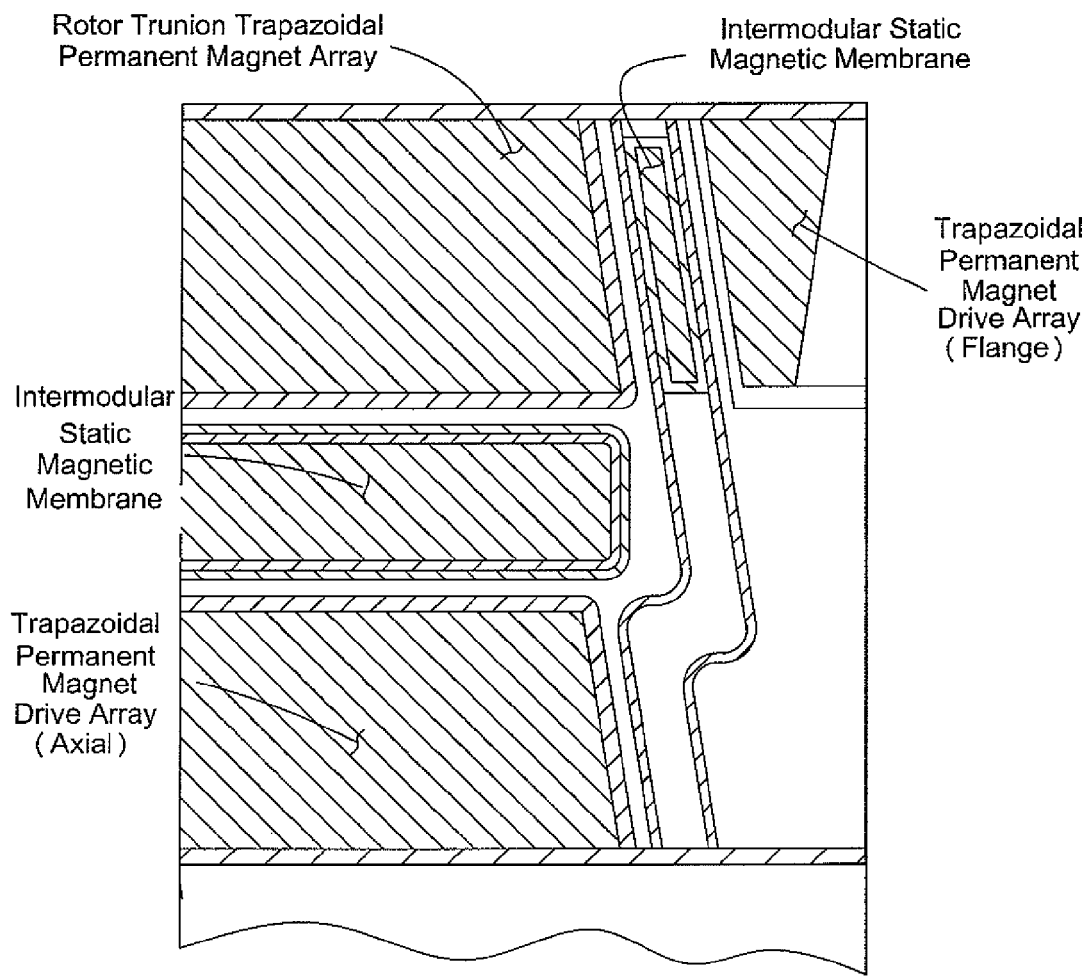
FIG. 8 is a profile cutaway view of a single stage stator drive gear array with permanent magnets in accordance with the disclosure.

The torque of the magnetic gears depends on the relative angular offset of the stator permanent magnets to the other offset of the rotor permanent magnets on the magnetic shaft and rotor trunion respectively. The relative angular offset, $\alpha$, is defined from the center of the North Pole on one gear to the center of the South Pole on the other as shown in FIG. 6, ($\alpha$=0°). The invention, the magnetic advanced gas-turbine transmission with radial aero nanomagnetic-drive (MAGTRAN) is an electromagnetic aero gas turbine engine transmission which requires high torque densities generated through high power electromagnetic fields, throughout, its operation, whether in low speed operation as in a descending flight path, or in a high speed operation as in climb out to cruising altitude. To reduce or eliminate the fall-off of the torque transmitted as the regular angular offset increases between pole pitches; and North and South poles, the magnetic drive component of the transmission has a second tier of magnet arrays, as in a pie geometric shape in segments alternating North and South Poles designated as a flange (see trapezoidal flange hub permanent magnet arrays in FIG. 6 and in FIG. 8, which is the x-oriented direction of the SHTPMA and sits 90 degrees opposed to the y-oriented SHTPMA housing the trapezoidal hub permanent magnet drive array). This structure and geometry of magnetic transmission architecture is novel and unique to MAGTRAN. It is next to the first set of trapezoidal magnet rotor arrays, in front view to the left and the right as in the flange, which are in part an architecture and structural geometric component of the trunion of the rotating rotor housing the bypass fan, compressor or turbine blades. Here, when the first tier of electromagnets is in phase and torque is transmitted, it rotates the relative angular offset. The angular offset then increases to the point to where it is a half a pole pitch advanced and the torque value is a maximum. Simultaneously during the rotational operation the second tier of magnetic poles offer the benefit of increase magnetic field surface area, and are perpendicular (vertically oriented as in a flange which is 90 degrees to an axial hub) to the first tier of magnetic poles, as they are axially oriented (as in the center body of an axial hub). The topology and architecture of the flange magnets is set so that as they rotate with the axial hub magnets their angular offset in relation to the magnetic poles in the rotating trunion of any magnetic gear turbomachinery component, reaches only a maximum of 45 degrees out of phase as in relative positioning to the axial hub magnets, which are also axially in relation to, and horizontal to the trunion permanent magnets, but 90 degrees to the flange of the magnetic shaft magnets and the adjacent magnets in the trunion, thus with the flange hub magnets they have a maximum torque transmission value when the axial torque transmission of the axial magnets is at zero, and visa verso, both in relation to the trunion permanent magnets. The maximization of torque density due to the angular offset phases between the SHTPMA trapezoidal flange hub permanent magnet arrays in the x-oriented direction and the 90 degree opposed, SHTPMA y-oriented trapezoidal hub permanent magnet drive arrays is unique in its structure and magnetic transmission operation. FIG. 7, denotes the torque density due to phases of angular offset representing cos h ($\alpha$, b) and cos h ($\alpha$, y) in SHTPMA for both the magnetic drive poles of the stator, axially and in the flange.

In this manner, at any given point in time, during the 360 degree rotational operation of the magnetic transmission turbomachinery, rotors and stators, which are structurally in-situ with the topology of the magnetic shaft, may rotate independently. Here the angular offset is always at a maximum when shared between the axial hub magnets at the stator and the trapezoidal magnet rotor arrays in the trunion; the flange hub magnets at the stator and the trapezoidal magnet rotor arrays, and their respective alternating magnetic faces, magnetic fields and shear gaps across the air gap. This in relation to, that the relative angular offset increases to the point to where it is a half a pole pitch away from the magnet face, and the torque value is at a maximum at 90 degrees out of phase, between the axial hub permanent magnet arrays, the flange hub permanent magnet arrays, and the transmitted magnetic torque power to the rotating trapezoidal magnet rotor arrays and trunion, with the housing, and holding any number of turbomachinery blades (bypass fan, compressor or turbine) means that the torque density values are at a maximum at all phases of each intermittent 45 degree quadrant, and 90 degree quadrants, therefore magnetic torque transfer is always transmitted across the air gap at the maximum allowable value in the MAGTRAN design (see FIG. 6 and FIG. 9). This type of drive train and power transmission technology has never been conceived before for an aero gas turbine, not alone for other gas turbine transmissions, or other magnetic gear transmissions that may be used in rail or automotive applications, or any applications where the transfer of power must be modulated and varied without necessitating the need for mechanical interface. It is therefore unique and novel in the art of aero gas turbines and magnetic transmission technology. In the art, all aero turbine transmissions are mechanically interfaced using multiple spools to transfer the power from the turbine to the compressor and bypass fan. Influence of the relative angular offset on a double stacked array of magnetic poles in the X and Z directions on the driver (stator or hub) relating to the follower (stator or flange) and the air gap upon magnetic advanced gas-turbine transmission with radial aero nanomagnetic-drive (MAGTRAN) is of unique magnetic gear topology defining the essence of the invention.

Torque Density Sustainment Relative to Angular Offset

The torque of the rotating stator magnetic pole, driven by the power turbine (which is rotated by the exhaust efflux from the combusted fuel coming from the combustor in a very high-speed, exhaust plume) depends on the relative angular offset of these gear poles in relation to the rotating trapezoidal rotor magnetic pole (FIG. 2) in which it is driving by the created high power magnetic field. The relative angular offset, $\alpha$, is defined from the center of the North pole on one gear, to the center of the South pole on the other (as shown in FIG. 7, $\alpha$=0°). FIG. 6 shows the torque of the rotating stator magnetic trapezoidal pole gears axially and the rotating stator magnetic pie-shape pole gears radially, as a function of the relative angular offset and the air gap to the then rotating rotor magnetic trapezoidal trunion pole gears housing structurally, any number of sets (or plurality) of turbomachinery blades.

When α-α is equal to zero between the stator magnetic trapezoidal pole gears axially and the flange rotating stator magnetic radial gears and are adjacent to magnets on the separate rotating trapezoidal magnetic poles making up the trunion of the magnetic shaft (MAGTRAN) the torque is equal to zero. Any angular offset, even fractions of a degree, the torque density and the ability of the MAGTRAN shaft to drive rotating turbomachinery components, which are integral parts of the trunions stage to stage, create forces which are significant (values in excess of 80 tonnes per newton meter, stronger than mechanical material direct links) from the generated magnetic fields and generate force vector components at each transmission station, stage to stage, for each turbomachinery stage in the engine utilizing the MAGTRAN transmission. When adjacent magnets in the rotating trapezoidal rotor magnetic pole of the trunion are face to face with the rotating stator magnetic pole (axial) and the rotating stator pole (flange) they experience the same magnetizations, and the torque is equal to zero providing a position that is stable. When they are not perfectly face to face and aligned, angular offset is present, and thus torque is created.

When the driver gear magnet pole of the rotating stator (axial) begins to rotate, and the driver gear magnet pole of the rotating stator magnetic pole (flange) gear begins to rotate simultaneously, the rotating trapezoidal rotor magnetic pole (FIG. 2) mounted in, and in-situ with the trunion of any plurality of turbomachinery blades (bypass fan, compressor or turbine) will have an angular off-set 90 degrees out of phase to either the driver gear magnet pole of the rotating horizontal stator (axial) or the driver gear magnet pole of the rotating vertical stator magnetic pole (flange) due to the alternating drive gear permanent magnets in these respective (SH-TPMA) axial hub or flange structures of MAGTRAN. Hence, the angular offset will always be advancing, and maximum torque density always achieved when the magnetic field begins decaying at the rotating horizontal stator (axial). The magnetic field shall be growing and advancing against the rotating vertical stator (flange); with respect to the trapezoidal trunion magnetic array; and conversely, when the magnetic field is decaying at the rotating stator pole (flange); with respect to the trapezoidal trunion magnetic array; the magnetic field shall be growing and advancing with respect to the rotating horizontal stator (axial) as the angular offset increases, maximizing the torque density value (FIG. 6). Throughout the 360 degrees of rotation therefore, very high torques densities are maintained and transmitted across the shear and air gaps with the intermodal static magnetic membrane maximizing field strength between the axial and flange arrays of the stator.

FIG. 7 shows the torque of the radial magnetic gears as a function of the relative angular offset, α, and the air gap between two respective magnetic gears (D=5, 8, 11 mm, respectively) for the rotating horizontal stator (axial), the rotating vertical stator (flange); and the angular offset with the trapezoidal trunion magnetic array of the rotor of the magnetic transmission. There are two series of sinusoidal vector waves which denote amplitude, or gain, and decay of the torque density relative to the angular offset of the magnetic gearing of the magnetic transmission. The first series of sinusoidal wave forms expresses the relation between the rotating horizontal stator (axial), and the rotating trapezoidal trunion magnetic array, where the angular offset is at a maximum at 100 Newton meters, it decays as the rotating horizontal stator approaches half of the distance to the 45 degree mark and here presents a value of zero, and the most stability before it grows again in the negative and maximum value again is realized at 100 Newton meters but the rotation of the gear, or the rotating horizontal stator (axial), is 45 degrees out of phase to the negative, but maximum torque is realized. The MAGTRAN architecture and topology is realized to attain maximum torque density all the time during the 360 degree of rotation of the magnetic shaft and its constituent axial and flange hub magnetic arrays as noted in the peaks at both positive and negative (in-phase and out-of-phase) aspects of the torque density sinusoidal curves at 0.0, 22.5, 45.0, 67.5 and 90.0 degrees, respective to the X-axis where torque density is zero. The maximum allowable decay to lower torque density limits is at +65 and −64 tonnes per Newton meter (the negative simply denotes the magnetic field in the opposing quadrant during the axis of rotation and relative angular offset influence) along the X-axis as denoted at above and below the x-axis where the intersection of two respective sinusoidal waves intersect in the y-axis fields, thus this is the newest value observed in torque density and provides this novel and revolutionary approach to aero gas turbine electromagnetic transmission design functionality and other magnetic transmission functions particularly where high speed torque applications are required.

When the relative angular offset is half a pole pitch, between any two given poles, the torque value is the maximum. This further means that torque density value is at or near maximum value throughout the complete 360 degree rotation (60 to 100 tonnes of force per Newton meter) of the magnetic transmission. Pullout occurs when the magnetic field passes any given permanent magnet array of the stator (the trapezoidal trunion rotor magnetic array passes in turn the rotating horizontal stator (axial) and the rotating vertical stator (flange), when geometric orientation is zero. After the pullout, the transmitted torque is decreased as the relative angular offset is increased. When either interfacing magnetic gears are equal to a pole pitch (45 degrees out of phase), either on the horizontal stator or vertical stator, in relation to the trunion rotor, the torque value is also zero. As alternating adjacent magnets in each are on separate gear faces, face to face with opposite magnetizations, this position becomes unstable, but is always countered and stabilized by either the horizontal stator or vertical stator magnetic arrays being out of phase by 22.5 degrees. This magnetic field topology in the known art of magnetic gears, or magnetic transmissions, and particularly in aero gas turbines has never been done before and is unique and novel.

The maximum torque of the magnetic gears in MAGTRAN is a function of the number of pole pairs and the geometry dimension for the given air gap, as well as the diameter of any stage and its axial (z) length. This being so the technology scales well for increases in power and thrust under the MAG-JET technology using MAGTRAN. The geometry is set at eight (8) pole pairs respectively to provide a magnetic transmission tunnel of 18.0" and a rotational speed at the turbine torque transfer position of 12,500 RPM, this being representative of operational speeds in a 45,000 lb. thrust supersonic turbine as described in previous patents under the S-MAG-JET filing, International Application No. PCT/US09/54317, which is known in the art of magnetic gears to be an optimal number to maximize torque density.

The curves in FIG. 7 show that the torque transmitted by the magnetic shaft and its constituent axial and flange hub magnetic arrays with fixed number of eight pole pairs is decreased quickly as the air gap between two gears is increased. In fact, for a given number of pole pairs, the level of the magnetic induction rapidly decreases with the air gap increasing.

The plotted sine curves in FIG. 7 also explain the size effect of the radius of trapezoidal magnets. From these curves, it is observed that the peak of magnetic torque is shifted from 8 pole pairs, to 12 pole pairs. By increasing the outer radius, respectively, of the rotating stator magnetic pole (axial) and the rotating stator magnetic pole (flange), and thus consequently decreasing the air gap in relation to the rotating trapezoidal rotor magnetic pole and its referenced radius to the magnetic shaft of the hub and flange magnetic topologies and respective air gaps, the torque density may be increased and the respective surface areas of the magnetic topologies decreased. This can be understood by considering the magnetic field strength on the surface and the area of each pole in the MAGTRAN topology (FIG. 6), where the magnetic field strength is disposed across an eight pole (8) circular array and that the field may be increased gradually with the number of poles (observe in FIG. 7 the top curve which is a 12 pole array topology), and a reduction in the air gap ((8 mm down to 6 mm) however the area of the surface of each pole is decreased as increasing the number of the poles causes this. Therefore, the combination of the two effects (increasing pole count and reduction in each pole surface area, along with air gap reduction) results in a maximum peak magnetic field and torque density, with the maximum peak shifting to the larger number of poles with larger radius of the cylindrical magnets, so the torque value reaches a maximum corresponding to an optimal width of the magnets.

This can be understood by the stator hub trapezoidal permanent magnet arrays (SHTPMA) and the rotor trunion trapezoidal permanent magnet arrays (RTTPMA) respective magnetic field strengths, on the surface and the area of each of their respective poles, that their magnetic field strength can be gradually increased by increasing the number of each poles for SHTPMA and RTTPMA, whereby a maximum peak of the flux field is exemplified with a shift to a larger diameter magnetic shaft. In the best topology of MAGTRAN it allows for a hollow magnetic shaft, and that the maximum peak shifts to the larger number of poles with larger radius of the trapezoidal permanent magnets, thus maximizing torque value through larger magnetic transmission diameters. This move to larger diameters to sustain larger magnetic fields sustains and benefits the original architecture of the hybrid scramjet, AHMJET as filed on Sep. 11, 2006 by SonicBlue Aerospace (U.S. Publication No. US 2007-0126292 A1) whereby the hollow tunnel of the magnetic shaft becomes the receptacle and detailed design for the compression ramp, throat, combustor and diffuser of an TBCC Hybrid Scramjet architecture where typical diameter exceeds 40.0" of the hollow magnetic shaft containing the compression tunnel of AHMJET.

Influence of Magnetic Variable Speed Transmission Ratio in MAGTRAN

Figure 9:
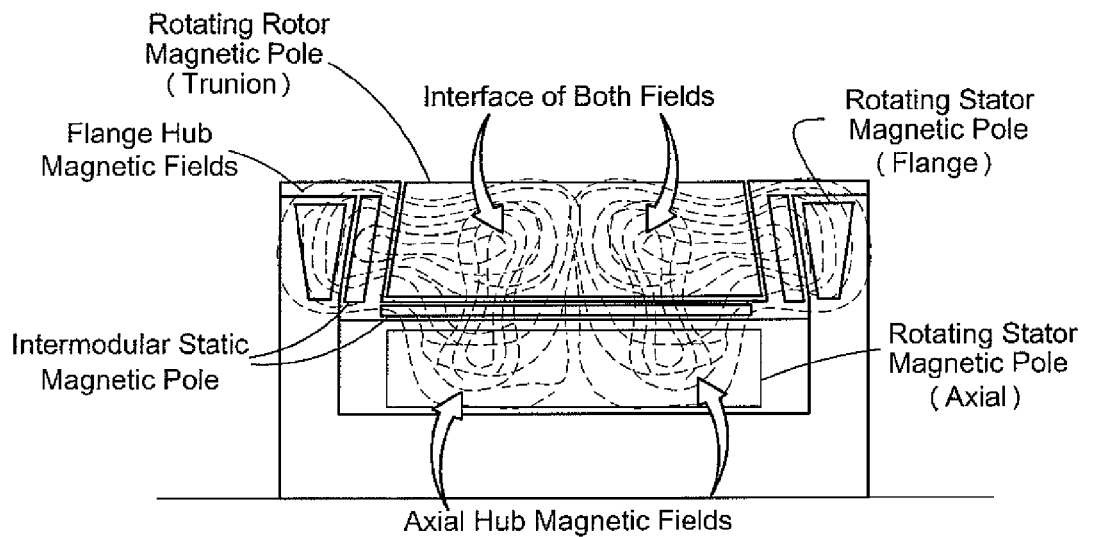
FIG. 9 is a conceptual cross-sectional view of illustrating the interaction of the various engine component magnetic fields.
Figure 9:
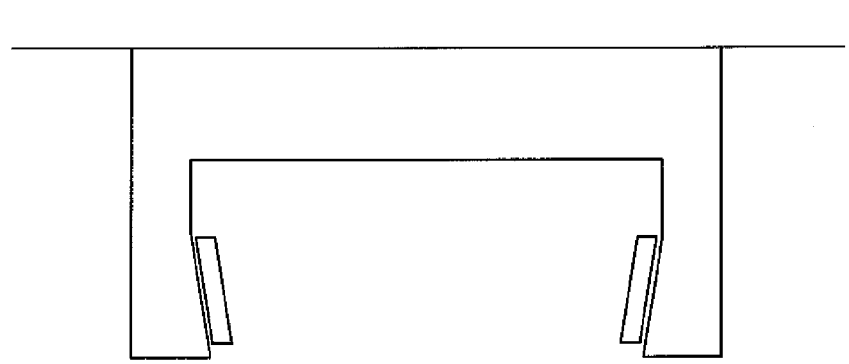

Similar to normal mechanical gears in power transmissions, but unlike mechanical spool (or shaft) drives in aerospace gas turbine engines which are not variable, variable transmission ratios are possible and defined in the invention MAGTRAN through the utilization of permanent magnetic gears, and through increasing or decreasing the magnetic field pulse through manipulation of the eddy current flux normal to the main transmission magnetic poles (and their respective transmitted magnetic flux), and between the number of pole pairs in the rotor and the outer radius of the stator magnetic drive gear, or shaft, and beyond fixed given values which is observed initially in FIG. 9 and Equation 11.

In the prior art it shows magnetically coupled transmissions such as U.S. Pat. Nos. 4,616,519 and 2,548,373 are either not true continuous variable transmissions (CVT), and or, have serious problems generating the high torque levels suitable for industry and high performance applications, such as in jet engines. Hybrid mechanical/magnetic CVT's have been shown to address the slippage problems but usually require exotic magnetic fluids or have problems reliably actuating the electro-magnets.

MAGTRAN defines for the first time a variable speed power train for an aero gas turbine which continuously varies magnet gear ratios via magnetic field pulse width and timing, hence modulation and field strength, thus a variable torque density is created, with the ability to adjust to the required optimum speeds of the turbomachinery (bypass fan, compressor and turbine) in relation to the transmission (stator or driver of MAGTRAN running from end to end of the engine), as set by the design flight mission profile of an aircraft, and for the aero gas turbine with a MAGTRAN drive train that will optimize to that flight mission. The MAGTRAN apparatus, has the ability to multiply the input shaft torque in an aero gas turbine machine, and hence speed, on any given staged segment per any specific turbomachinery stage, meeting requirements for optimum flight and emissions. The center magnetic output shaft is similar in direct proportion to the RPM ratio input shaft, as in a normal "geared" transmissions, or in the sense of conventional mechanically linked "spooled" turbine transmissions, but it differs that each turbomachinery segment (as in eight compressor segments that would make up 5-MAGJET) may be adjusted to differing magnetic ratios (continuously) unlike conventional turbines, and may be counter rotating. The MAGTRAN apparatus is a first of its kind specific to aero gas turbine engines and is not a magnetic clutch that can only couple from 0-100% of the input torque to output, but is instead a true torque multiplying transmission.

In practical designs, the output torque can be as much as 50 times the input torque. The power is coupled by permanent magnets where the coefficient of coupling is controlled by the rotational speed of the intermodular dynamic magnetic membrane (IDMM), its relation to the stator hub trapezoidal permanent magnet arrays (SHTPMA) and the rotor trunion trapezoidal permanent magnet arrays (RTTPMA) through an open loop electronic circuit controller connected by a central circuit processor (FIG. 17) to each flux gate path for the normal magnitude flow of eddy currents which impart an electromagnetic drag upon the RTTPMA from the eddy currents generated through the IDMM and the inter-magnetic interference between magnetic flux growth and decay and the angular onset of rotating poles between the SHTPMA and the RTTPMA. In one variation electric circuit control loop is positioned to adjust the rotational speed of the intermodular dynamic magnetic membrane (IDMM) which senses the input RPM from the stator hub trapezoidal permanent magnet array (SHTPMA) and adjusts the magnetic coupling and flux strength to maintain the rotor trunion trapezoidal permanent magnet array at a fixed RPM, a new higher or lower rpm, or a continuously varying RPM (as in aircraft climb out where the aircraft is climbing in excess of 4000 feet per minute and air density, oxygen content, and hence combustion, and each stage may be counter-rotating therefore enhancing compression for combustion, removing the need for stators. These stages can be adjusted continuously to optimize the compressor condition, therefore the combustion condition, therefore a continuously varying transmission in the compressor is possible (this also applies to a dual bypass fan and multi-stage power turbine), each stage ideally rotating at its desired RPM at any given point in time. These ideal optimized operational conditions adjust continuously to varying atmospheric conditions of the engine as an aircraft flies in the air for example, gaining altitude in a climb out. In MAGTRAN torque slippage in the magnetic transmission during a climb out condition can be adjusted, and hence RPM, to the rotor trunion trapezoidal permanent magnet (RTTPMA) array, in relation to the stator hub trapezoidal permanent magnet array (SHTPMA), or conversely, the rotor trunion trapezoidal permanent magnet array stays at fixed RPM for a particular atmospheric condition or operation, IFR altitude condition fix, and here the stator hub magnetically attached to the power turbine may be slowed down or sped up to decrease or maximize fuel burn.

This has tremendous benefit in an aero gas turbine engine where the MAGTRAN machine structural architecture and magnetic topology is the core technology leverage-or for a revolutionary aero gas turbine engine design. As another example, for the first time, a single MAGJET/MAGTRAN engine can operate below and above the speed of sound, it removes the need for two separate and different engine designs to accomplish subsonic and supersonic flight and it will dramatically impact aircraft design across all flight regimes. For a given mission profile for example, as in climb out to cruising altitude, the air density and temperature changes along with other environmental factors. There is a subsequent need based on ideal operating conditions for the independent compressor stages in a MAGJET architecture (reference previous SonicBlue patents) to operate distinctly at specific speeds to accommodate the rapidly changing atmospheric conditions during aircraft climb out for example. As altitude is gained the forward compressor stages need to be speeded up as air density has dropped and higher rotational speeds are required to compress the same amount of air. Each stage ideally should compress the air optimally and to do so would have each, its specific RPM. The middle stages of the compressor as altitude is gained needs to maintain velocity flow of the mass air, so here they may want to be operating at a slightly lower RPM then the forward stages as now air of decreased air density has a higher compression velocity. Lastly, the compressor stages closest to the combustor need to be operating at a very high speed accommodating the rapidly accelerating lower density air, but also needing to raise the temperature of the cooler air, their ideal operating speeds must accommodate a greater amount of work needed already upon the compressed air coming from forward stages. Here a varying speed transmission is the ideal mechanism for aero gas turbine compressors, and other noted turbomachinery components, to operate at maximum efficiency where highly variable flight and environmental conditions are realized and the invention like MAGTRAN can provide that optimal variable speed and torque, machine solution.

Figure 10:
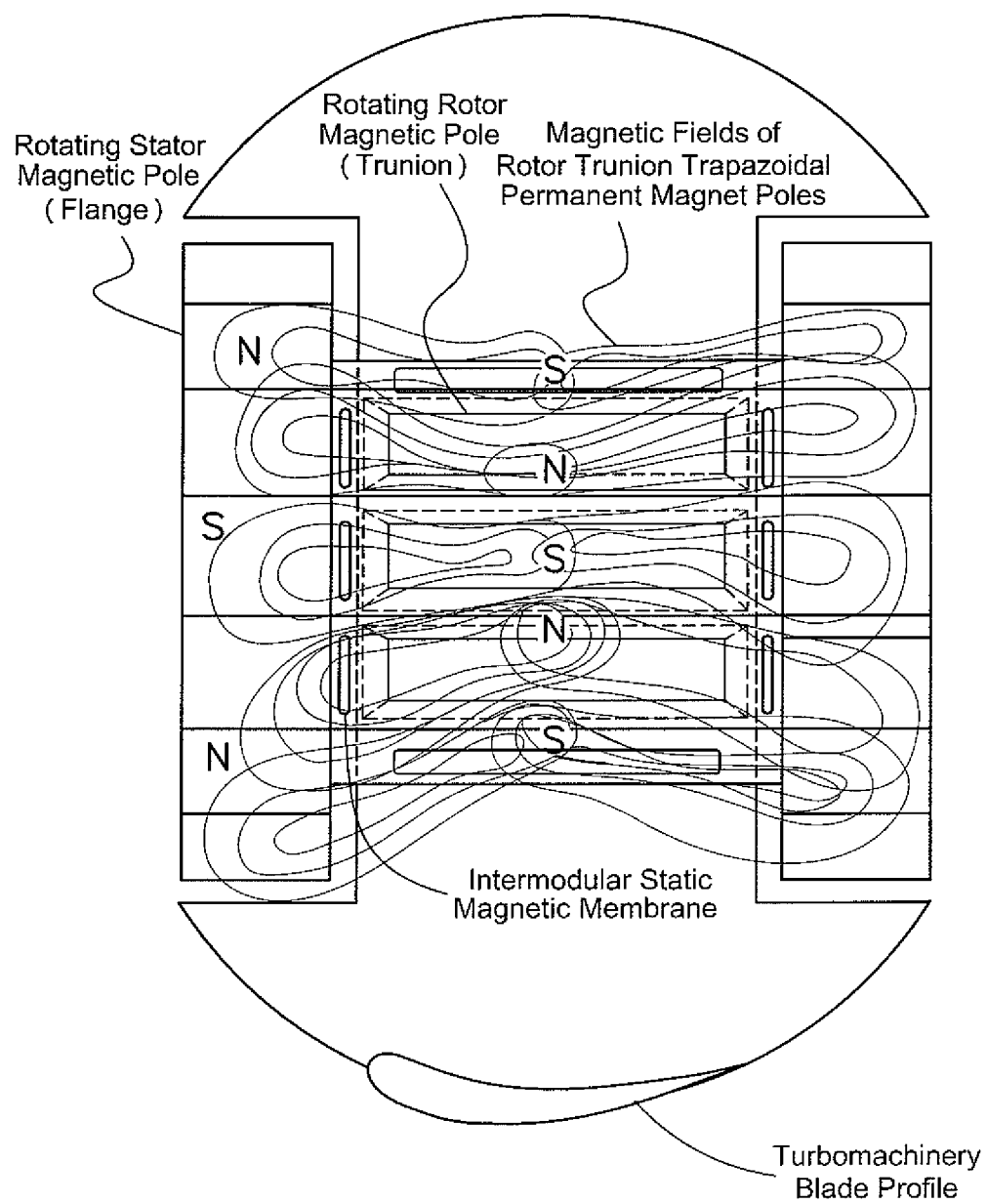
FIG. 10 is a conceptual plan view of a single stage stator drive gear array similar to FIG. 6.

Torque multiplication to provide a constantly varying, torque transmission, high speed machine is essentially a DC adjustable-torque magnetic device for dynamically operating the torque density, hence the magnetic transmission ratio of MAGTRAN. As depicted in FIG. 10 the MAGTRAN turbomachinery segment utilizes the multipole permanent magnet with poles in the form of circular sectors both in the stator hub trapezoidal permanent magnet arrays (SHTPMA) and the rotor trunion trapezoidal permanent magnet arrays (RTPPMA), and with the pair of intermodular dynamic magnetic membrane (IDMM) discs located one-on-each-side-of RTTPMA flange elements, and above the SHTPMA hub rotating elements. The IDMM discs provide flux paths, or flux gates, between the pole sectors of SHTPMA, of opposite polarity, and thus cause a magnetic drag resisting relative rotation between the hub and the flange. A flux gate is interposed between any permanent magnet pie section of SHTPMA and one of the IDMM discs (this occurring on both sides of the hub) so that the torque density affiliated with the magnetic field may be adjusted by positioning the flux gate relative to the magnet pie sector of SHTPMA, between a maximum torque position, wherein magnetic flux passes through the flux gate to and from the adjacent IDMM, to a minimum torque position, wherein a portion of the flux is shunted through the gate to bypass the adjacent circuit disc, and thus a torque drag occurs and the ratio of magnetic flux passing through the gate and staying on one side with the SHTPMA provides the ratio capability of the magnetic field. The same topology and architecture exists for the RTTPMA where the IDMM acts as an inertial magnetic drag mass through its flux gates adjacent to the RTTPMA on either side of the trapezoidal permanent magnet pie sections, also providing a transmission ratio capacity.

Torque multiplication is achieved thus through magnetic coupling "pulses" within the magnetic fields through the flux gates, between the input stator hub trapezoidal permanent magnet arrays (SHTPMA) on the shaft and the output rotor trunion trapezoidal permanent magnet arrays (RTTPMA) surrounding the magnetic shaft, and the intermodular dynamic magnetic membrane (IDMM) at given position and at any specific point in time, therefore the intermodular dynamic magnetic membrane through alignment, or non-alignment, to the respective magnetic flux gates, and hence magnetic flux fields generated between the stator hub trapezoidal permanent magnet arrays and the rotor trunion trapezoidal permanent magnet arrays, for any particular MAGTRAN turbomachinery engine segment can achieve a variable magnetic field ratio.

This approach to utilization of the topology of MAGTRAN and its structure falls within the law of "Conservation of Energy", where the energy transfer in the magnetic coupling "pulses" is a fixed quantity (joules) regardless of the RPM ratio in the aero gas turbine engine turbomachinery segment using MAGTRAN topology, between the stator hub trapezoidal permanent magnet arrays and the rotor trunion trapezoidal permanent magnet arrays and the amount of flux passing through the flux gates dependent on their position to the magnetic fields generated by the magnet poles is dependent on the joule count and the alignment of the flux gates, driven relative to the angular offset of torque density, this, as it relates to respective alignment of magnetic poles in the stator and the rotor.

Varying the ratio through the magnetic field pulses through flux gates and subsequent alignment with respective poles on both the rotating stator hub trapezoidal permanent magnet arrays (SHTPMA) and the rotor trunion trapezoidal permanent magnet arrays (RTPPMA) is the operating mechanism of electrophysical means to provide the varying transmission ratios in the MAGTRAN apparatus. This has not been done before in an aero gas turbine transmission drive train and is unique and novel, nor for any magnetic transmission for that matter. It is directly specific to the rotating intermodular dynamic magnetic membrane set (set pair), between the magnetic fields of SHTPMA and RTPPMA, also rotating, its position at any given point in time, in relation to the SHTPMA and RTPPMA poles and whether the flux gates are open, or closed, therefore managing the magnetic flux flow path and subsequent torque density and hence torque ratio. In other words, its positioning (the IDMM) to the angular offset of the poles to one another in SHTPMA and RTPPMA, and relative positioning of the percentage of open or closed the flux gate is; is what manages magnetic torque slippage, or execution of creating therefore a torque ratio, through the magnetic coupling pulses through the flux gates, and reaches 100%, or other than this, for maximum operating values of the variable torque transmission densities through the magnetic flux and the percentage through the opening and closing flux gate paths. Operation up to this 100% point is possible by simply increasing the magnitude of the magnetic coupling or flux between the rotating stator hub trapezoidal permanent magnet arrays and the rotor trunion trapezoidal permanent magnet arrays through influence of the open loop electric circuit, and the flow of flux defined by the position of the IDMM, this based on charge alignment to the North and South poles of the STPPMA and RTPPMA and the position of the flux gates for the flux to pass through.

Figure 13:
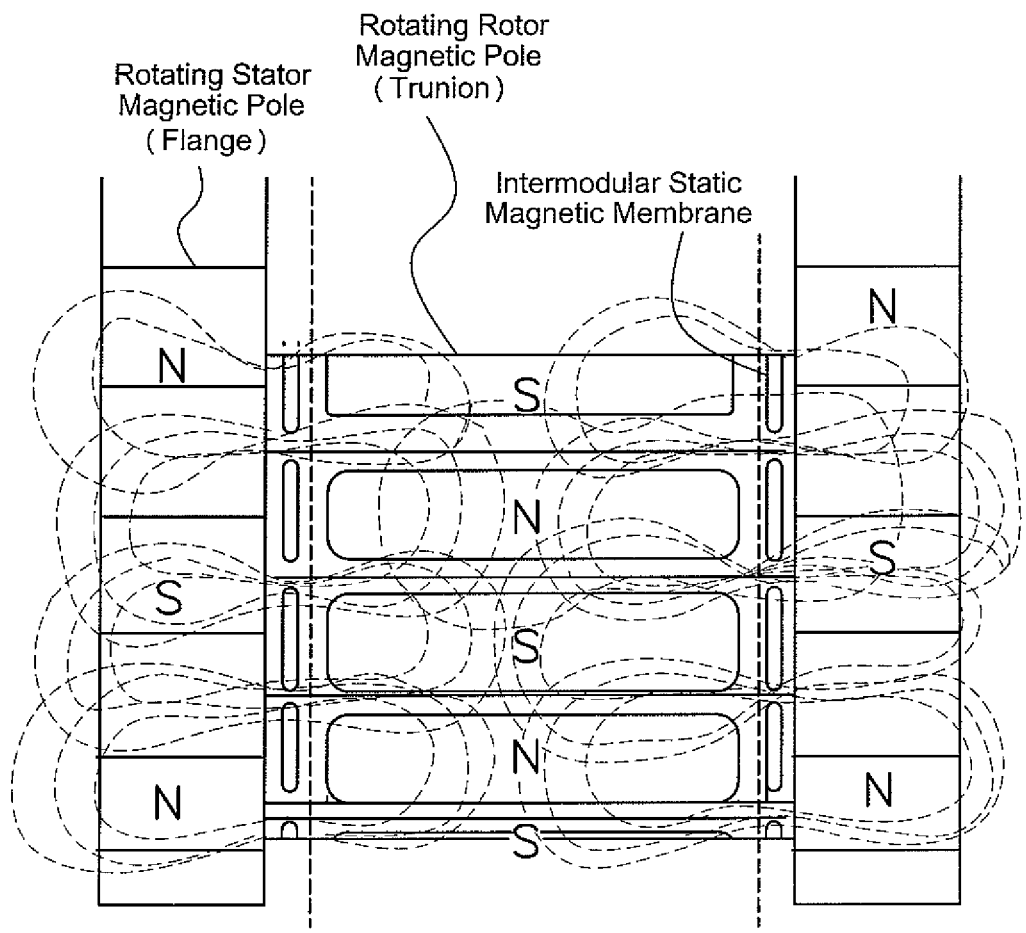
FIG. 13 is a conceptual plan view of the rotational magnetic field ratio and magnetic position topology with flux gates partially open illustrating the relevant magnetic fields in accordance with the disclosure.
Figure 16:
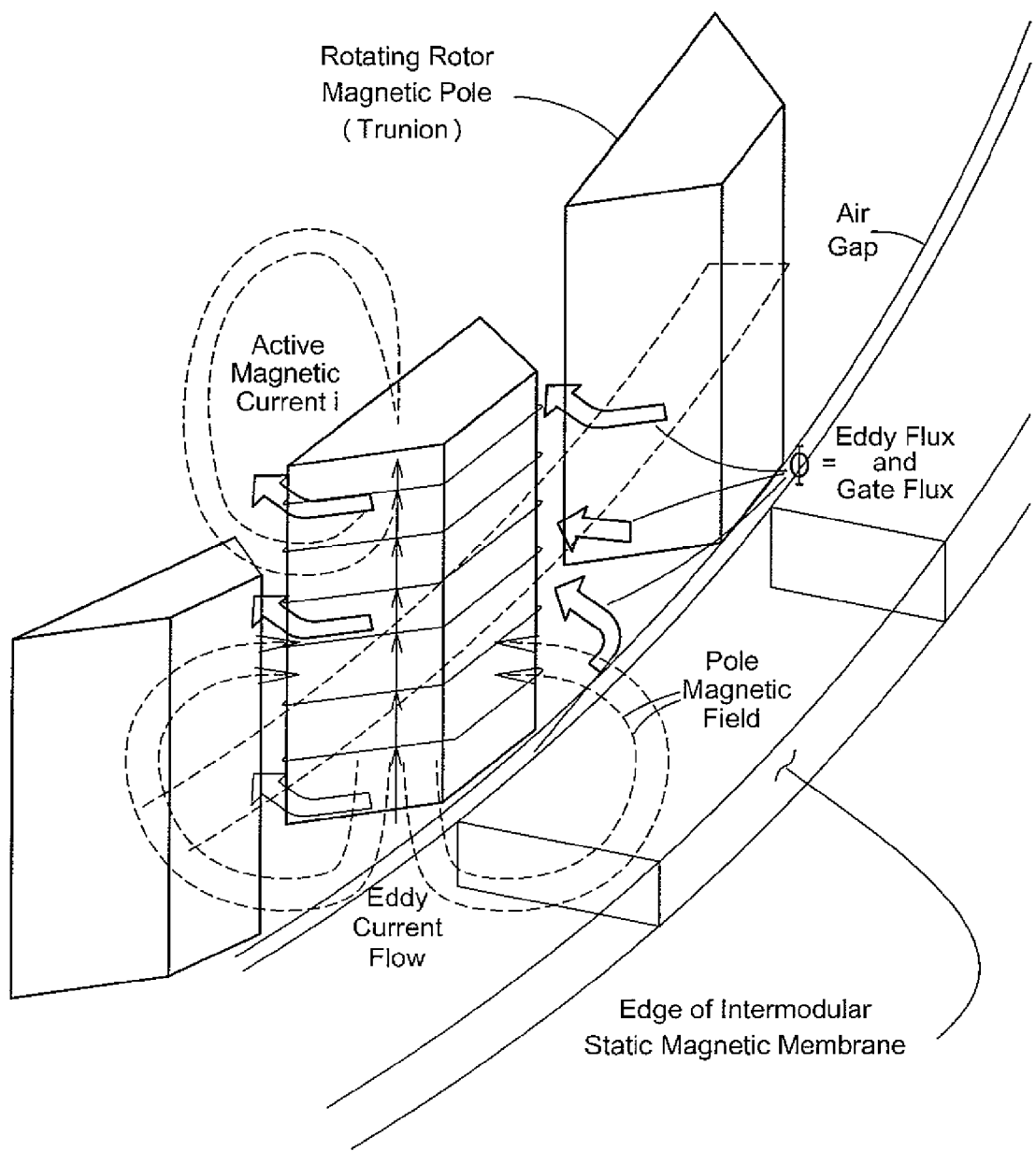
FIG. 16 is a conceptual view of a flux gate and the various engine components which form an open loop control circuit.

The rotational speed to control the pulses of the flux through the flux gates, and the percentage of the gates that are open is controlled by incorporating an electronic open circuit control governor upon the intermodular dynamic magnetic membrane that electromagnetically controls the magnitude of the magnetic coupling through electrical impedance via the eddy currents normal to the magnetic flux flow of SHTPMA and RTTPMA and is defined in an algorithmic equation and reference, FIGS. 13 and 16. The influence of eddy current magnetic normal phase upon the magnetic coupling (between SHTPMA and RTTPMA) as an impedance acts as a pinning center, or a pseudo lock, within the perpendicular flow of the major magnetic field along the axis of North/South of any magnetic pole, being pulled to a 90 degree out of phase flow, where magnetic attraction or repulsion at the electron level occurs. The normal eddy current flow raises electrons in the outer shells of the atomic molecules dropping a charge, with resultant higher levels creating propulsive forces where the voltage cause "electric current" characteristics which cause magnetic flux trapping. This trapping creates magnetic friction, or acceleration, controlled by the electric circuit at the flux gate, and it is here that the speed of the magnetic pole and associated flux gaps act to transmit a magnetic ratio impedance or acceleration upon the rotor (RTTPMA) through the IDMM and flux gates, from the stator driver (SHTPMA) and thereby raising the magnetic flux motion and raising the critical current of eddy's across the flux gate allowing for precise electronic transmission ratio control.

The following numerical analysis substantiates the drag or propulsive forces for eddy currents Normal to the flow of the magnetic field between SHTPMA and RTTPMA through the magnetic flux gap.

A force of one newton is required to cause a mass of 1 kilogram to accelerate at a rate of 1 meter per second per second. One joule is the energy required (the work done) in moving an object 1 meter against a resisting force of 1 newton. Potential energy (mechanical) is the capacity of a body to do work because of its position in a force field. Kinetic energy is the energy possessed by a body due to its motion ($KE=m.v^2/2$). i.e. a mass of 1 kg moving with a velocity of 1 m/s has a kinetic energy of ½ joule.

Using electrical units a charge of 1 coulomb gains an energy of 1 joule in moving through a potential difference of 1 Volt.

One watt is the power required to do the work of 1 joule in one second. Instantaneous power $P=dW/dt$.

In electrical units a flow of charge of coulomb/sec (=a current of 1 Ampere) flowing against a potential difference of 1 volt requires a power of 1 watt.

$$P=dW/dt$$

A charge is the electrostatic force resulting from presence of electrons. This is a quantized variable because the smallest charge is that resulting from 1 electron ($1,602.10^{-19}$ Coulomb). The Coulomb is the charge on $6,24.10^{18}$ electrons or as a charge experiencing a force of 1 Newton in a electric field of 1 Volt per meter, or as the charge transferred in 1 second at a current of 1 Ampere. ($Q=I.t$) The current through an area A is defined by the electric charge passing through A per unit of time. An Ampere is the charge flow of 1 coulomb per second. In general the charges may be positive and negative each moving through the area in opposite directions. The current is the net rate of flow of positive charges, a scalar quantity. For example if positive charges are moving to the right and negative charges are moving to the left then the net effect is the sum of the rate of positive charges and the rate of negative charge, moving to the right.

$$\underline{r}=dQ/dt$$

The energy transfer of a flow of electric charge is determined by the potential difference of voltage through which the charge moves. A charge of 1 coulomb acquires or delivers an energy of 1 joule in moving through a potential difference of 1 volt.

$$V=dW/dQ$$

The electromotive force is the force which produce an electric current. The potential difference in Volts developed by a generator, battery etc. An e.m.f can be produced by chemical action in batteries or cells, mechanical energy using magnetic induction/piezo-electric crystals, thermal energy using thermocouples, solar energy using solar cells. The field is a convenient concept in calculating electric and magnetic forces. Around a charge we imagining a region of influence called an "electric field". The electric field E is a vector defined by the magnitude and direction of the force (F) on a unit positive charge in the field In vector notation the defining equation is $F=Q.E$. The units of electric field strength are newtons per coulomb.

The field strength in newtons per coulomb is equal and opposite to the voltage gradient.

$$E=dV/dl(V/m)$$

The magnetic flux density around a moving charge or an electric current there is a region of influence called a "magnetic field". The magnetic field associated with a bar magnet results from spinning electrons in the atoms of iron. The intensity of the magnetic field is measured by the magnetic flux density B is measured in teslas(T). It is defined by the magnitude and direction of the force exerted on a charge (Q) moving in a field with a velocity (v). In vector notation:

$$F(\text{force})=QvB(\text{Charge}\times\text{Velocity}\times\text{Flux Density})$$

$$Q=I\times t(\text{Current}\times\text{Time}) \text{ and } v=l/t(\text{length/unit time})$$

$$F=(l\times t)\times(l/t)B$$

That is a force of 1 newton is experienced by a charge of 1 coulomb moving with a velocity of 1 m/s normal to a magnetic flux density of 1 tesla. Also a force of 1 newton is experienced by a conductor, normal to the magnetic field, carrying a current of 1 ampere per meter length of conductor. Magnetic Flux historically has, in terms of magnetic fields, have been described as lines of force of flux. The magnetic flux φ measured in Webers (Wb) are obtained by integrating magnetic flux density over an area.

$$\phi=\int B\cdot dA$$

As the output magnetic shaft; stator hub trapezoidal permanent magnet array; RPM increases, the magnitude of the magnetic coupling to the rotor trunion trapezoidal permanent magnet array will decrease to compensate, thus maintaining the "conservation of energy".

To keep the stator hub trapezoidal permanent magnet arrays (SHTPMA) and the rotor trunion trapezoidal permanent magnet arrays (RTTPMA) from prematurely "locking" or "stalling", the actual magnitude of the magnetic coupling between them is adjusted electromagnetically via the speed (RPM) and positioning of the faces of the intermodular dynamic magnetic membrane (IDMM) relative to the SHTPMA and the RTTPMA, this in both quadrants of axial and flange, 90 degrees opposed to one another referencing the position of the IDMMs, to SHTPMA and RTTPMA, and respective angular offsets of the generating magnetic flux, and subsequent torque density. Between this geometric magnetic topology and structure of the magnetic transmission segment (MAGTRAN), in essence, the slippage of the torque density, and its respective generated magnetic field, is created due to the positive interference of the respective electric fields from the electric circuit influence upon each flux gate, and them positioning themselves amidst the angular offset magnetic fields of the SHTPMA and the RTTPMA at the interface of the IDMM and each respective eddy current flux gate path. This electric interference is not strong enough to disrupt the magnetic lock between the SHTPMA interface of the magnets and respective RTTPMA poles, momentarily aligned with the IDMM magnetic faces during rotation, but enough to distort the field and provide a rotational magnetic field ratio (RMFR) that can vary from 1:1 to 50:1 (FIG. 11) and strong enough to have an electromagnetic braking or acceleration effect upon the RTTPMA from the IDMM, and normal flow of eddy current field strengths.

So that the average magnetic coupling of MAGTRAN between stages and the interface of RTTPMA, and SHTPMA does not exceed the available input magnetic shaft torque it may be controlled by an electronic open control loop that senses the input shaft RPM and maintains it at a desired level by changing the magnetic coupling field strength through the natural use of eddy currents through the magnetic flux gates at the IDMM and RTTP pole interface. For many applications it is not necessary to control the magnitude of the magnetic coupling, if the average magnetic coupling does not exceed the available input magnetic shaft torque. Another variation is to have utility of a force vector control loop that monitors the electric motive force (EMF) in the field against the eddy current flux. This approach maintains the magnetic torque ratio from the input shaft (SHTPMA) to the output shaft (RTTPMA) by sensing the input magnetic shaft RPM (SHTPMA), torque and the output magnetic shaft (stage rotor) RPM (RTTPMA). It would adjust the magnetic coupling through assimilating a electromagnetic force vector using a processor in the eddy current flux and rationing the EMF against the flux and its difference to guide the RPM between the SHTPMA and the RTTPMA, maintaining input shaft to output shaft torque ratio proportional to the input shaft RPM divided by the output shaft RPM.

Another aspect of MAGTRAN is the fact that the magnetic coupling between the input of SHTPMA and the output of RTTPMA magnetic stage is that it must be "imbalanced". As the magnets from the input shaft pass the magnets from the output shaft, the sum total of the "attraction" and "repulsion" forces must be other than zero. It must be a net attraction or repulsion between the SHTPMA and RTTPMA. This disclosure shows several ways to implement this in FIGS. 9, 10 and 11. In MAGTRAN no one set of magnets in SHTPMA is connected to any other set of magnets, such as with RTTPMA, nor the governing magnetic field interface with the IDMM, and it not being connected to either of these other structures. As described earlier, magnetic ratios are possible with MAGTRAN by rotating the magnets of IDMM interfaced between SHTPMA and RTTPMA, and having the north and south poles align, or then not align, hence governing the angular offset, its positioning, and hence field strength in relation to the torque, and thus connected in a specific governed ratio to the SHTPAM and or the RTTPMA, or both and the relations to the other magnet arrays in IDMM.

Another set of variations for MAGTRAN in an operating torque density variance, and hence a multitude of adjustable magnetic gear ratios electronically through the electronic circuit open control loop sensor works by allowing the magnet positions within SHTPMA and/or RTTPMA to "flap" or "slide" in relation to each other, and in relation to IDMM (they are closest to the magnetic field interface here with IDMM). Some of these variations allow for "duty-cycle" modulation of the output torque "dwell-time", which includes "lead" or "lag" times of the angular offset between any two magnet interfaces, and the relative growth or decay of any magnetic field, due to angular offset, created between magnet position interfaces.

Torque and Transmission Ratio Control by Eddy Current Flux Manipulation

Over the last 30 years, permanent-magnet transmission couplings have come into the manufacturing forefront. This technology can operate at high speeds without contact or wear of active components, and at temperatures from cryogenic to 1500° F. Permanent magnetic transmission couplings also correct misalignments and provide overload protection within a single set of components. Once applied only to chemical pumps, magnetic couplings are now used in a variety of applications, ranging from downhole oilwells, liquid nitrogen pumps, high-pressure compressors, severely misaligned drivelines, and non-contact vibration isolation drives for encoders and torque transducers.

Known in the art there are three basic methods of mechanical power transfer and transmission ratio capabilities using permanent magnets. The first is synchronous power transfer where one magnet follows another. Two sets of strong magnets are arranged on opposing components. The pole pieces attract one another so that the magnet sets stay in synch and torque is transmitted. There is no relative motion between the driver and driven—only static rotation relative to the pole pieces due to torque. When the torque rating of this coupling/clutch is exceeded, the two parts slip and very little torque is transmitted. Depending on rotational velocity, the parts reengage at the next set of poles.

The next basic method is hysteresis power transfer where, like synchronous power one magnet follows another, but here a strongly magnetic driver is attracted to a weaker magnetically driven material. Torque is transmitted until it reaches the magnitude at which the weak material slips. When this happens, transmitted torque holds constant as the weak material is magnetized and demagnetized by close proximity of the strong magnet, and the two parts move relative to one another. In some cases, substantial heat is generated. Then once the overload is removed, the components automatically reengage. Slip torque can be adjusted by changing the relative position of opposing strong magnets on either side of the weak magnetic material, or by varying the magnet gap or overlap location.

Eddy current power transfer is the last method where in this case, Lenz's Law ($V_{induced} = -\partial \phi : \partial t$) and the properties of conductors in a magnetic field are to be leveraged. To review, Lenz's Law states that induced current flows to electromagnetically oppose the motion, or cause, by which its produced.

In the case of eddy current power transfer the rotating magnetic field sets up opposing electrical eddy-current fields in the conductive disc, causing them to produce a magnetic field that drags against the opposing rotating magnets. Eventually, the conductive disk nearly catches up with the driving magnets. There is always slippage in eddy current units. This type can be constructed with variable torque by adjusting the phase or air gap of the magnets. Due to generation of the eddy currents in the conductive disc, adequate cooling is necessary to prevent overheating. This cooling is normally supplied by airflow during rotation; however, at lower speeds external cooling is required.

MAGTRAN topology is a pseudo, hysteresis-eddy current variable drive (PHECVD) power transfer electric topology, where eddy currents and their electrons at a nano-scale may provide influence to the major magnetic field components of a magnetic transmission such as in MAGTRAN, and where a true hybrid magnetic motive force combining management and control of the opposing eddy currents (or normal to the field of the major magnetic driving fields of MAGTRAN) created from the rotating magnetic fields of the transmission, and passing through a flux gating mechanism, driven by the primary hysteresis magnetic motive force from the rotating magnetic field of which eddy currents are a byproduct thereof. Here, the stator hub trapezoidal permanent magnet arrays (SHTPMA) is one rotating magnetic field (driver), and the rotor trunion trapezoidal permanent magnet arrays (RTTPMA) is the second rotating magnetic field (the receiving drive), and the conductive disc is the intermodular dynamic magnetic membrane (IDMM), being a set of rotating pole elements, which has opposing electrical eddy-current fields set up by the SHTPMA because of its interaction with it. Here the SHTPMA is the stronger magnetic driver and it is attracted to the weaker intermodular dynamic magnetic membrane (IDMM) magnetized material, but the RTTPMA, transposed axially in the magnetic transmission hub segment of MAGTRAN is a magnetic material of lesser strength to SHTPMA, but greater strength to IDMM, and the position of the IDMM and its poles, relative to the poles of both the SHTPMA and RTTPMA simultaneously, and the speed and torque generated, relative to the position of the gated fluxes which is governs the torque and the speed, and ultimately are governed through a closed electrical torque and speed direct controls loop circuit, with eventually the IDMM catching up with the SHTPMA and the angular offset phase is reset and the process of speed and positioning of the IDMM starts all over again, this occurring in milli-second time transients. The variable torque of the PHECVD system is conducted by the positioning of the phase and angular offset, the flux gate pathways relative to the SHTPMA and the RTTPMA through the respective position of IDMM and the eddy current transfer magnetic drag through the flux gates, and the impingement of the drag against the SHTPMA, relative to RTTPMA and slow down and reset of the magnetic phase through the torque and density angular offset created as it relates to the effects of eddy currents passing through, or not passing through, or the percentage passing through the flux gates of the IDMM.

Similar in some respects to magnetic couplings, the pseudo, hysteresis-eddy current direct drive (PHECD) transmission of MAGTRAN can also act as a torque-limiting power transmission element to prevent drive train failure under excessive loads in the aero gas turbine. In the MAGTRAN topology the magnetic segment couplings per each plurality of turbomachinery segment are robust and when optimized are very efficient in the gas turbine. The torque profile is tailored to provide the ability to connect or disconnect several turbine segments when not needed, or needed, to optimize a flight condition of particular portion of the flight mission. The segment can be rotating at different speeds and safely re-engaging the magnetic shaft drive without introducing transmission train shock loads by the speed of the rotating magnetic fields and the positioning of the flux gates due to angular offsets between the three respective differentially rotating magnetic pole assembly's (SHTPMA, RTTPMA and IDMM). MAGTRAN is purely passive-actively controlled through direct torque control within each plurality of a MAGTRAN segment; this allows the load capacity to be controlled and the engine system segments (bypass fan, compressor and turbine) to be rapidly coupled and de-coupled.

As torque increases during coupling, angular off-set comes to a maximum position causing the eddy currents to counter the magnetic fields of SHTPMA and RTPPMA forming a magnetic drag component against them and the opposing rotating magnets in their arrays. Eventually the magnetic poles in the IDMM a causing them to produce a magnetic field that drags against the opposing rotating magnets, however they eventually catches up with the driving magnets as the angular offset passes maximum, torque declines momentarily between the pole pitches and slippage in the eddy currents is noted through the magnetic flux gates which are associated with the positioning of the angular offset. This type can be constructed with variable torque by adjusting the phase of the angular offset or air gap of the magnets between the SHTPMA and the RTTPMA. Torque is transmitted between SHTPMA and RTTPMA until it reaches the magnitude at which the weak magnetic material slips, the IDMM being the weaker material imposed by the magnetic drag of the eddy currents passing through the flux gates dependent on its position and relation to the RTTPMA. When this happens, transmitted torque holds constant as the weak material is magnetized and demagnetized by close proximity of the strong magnet, and the two parts move relative to one another again. The actual magnitude of the magnetic coupling and the torque between them is adjusted electromagnetically via the speed (RPM) and positioning of the faces of the intermodular dynamic magnetic membrane (IDMM), the respective flux gate paths, the electronic controller circuit, and its cause to modify in any instantaneous point in time and relative position to the SHTPMA and the RTTPMA.

Magnetic Dampening Through Eddy Current Flux Gate Paths

It the case of MAGTRAN it is advantageous to add lateral damping in the turbomachinery rotating systems to suppress excessive vibration in both the transverse, axial and torsional directions. Magnetic dampers may be advantageous to other damping mechanisms because they provide damping independent of temperature, and are non-contact in nature, which allows for maintenance and lubrication free operation. The MAGTRAN damping mechanisms function through the eddy currents that are formed from the position of the IDMM relative to the stronger field of SHTPMA and the weaker field of RTTPMA, and magnetic flux gate position formed by the IDMM and speed due to angular offset in its conductive material when it is subjected to the time changing magnetic flux through the open loop electronic circuit controller and processor.

The magnetic currents which circulate inside SHTPMA and RTTPMA as the conductor form in such a way that a new magnetic field is generated from the eddy currents) with a polarity that varies with the change in the applied magnetic flux and the position of the flux gates at the IDMM pole gaps. The interaction between the applied magnetic field (SHTPMA and RTTPMA) and the field due to the eddy currents (IDMM) causes the generation of a force that opposes the change in flux, or a force of magnetic drag, its magnitude varied largely by an electric field current interrupter from the open loop electronic circuit controlled of nominal voltage and amps, only significant enough to redistribute electron paths in the magnetic flux associated in the eddy currents. However, due to the internal resistance of the conductor (SHTPMA) the eddy currents will largely dissipate into heat, causing a removal of energy from the IDDM rotating system into the RTTPMA.

This dissipation of energy into the RTTPMA allows the conductor, SHTPMA, to form a damper that is used to suppress the vibration of the turbine ring segment and magnetic track structure. However, when used in rotating systems this additional damping from eddy currents often comes at the cost of a drag force which reduces the system efficiency. However, the integration of the IDMM, its relative rotating position to both SHTPMA and RTTPMA and alignment of drag reducing electromagnetic paths through flux gates is a novel eddy current mechanism in which the rotational drag can is negligible. The magnetic damper mechanism can be theoretically modeled and the damping energy determined, and finite element analysis used to predict the force exerted on the shaft as it vibrates. Numerical analysis is performed and exemplified in Equation 23 where assumption of energy consumed from all vibration is summated in eddy current "h" for all of cos-h between to the derivative function of "B" for all of "y" and "b" in the theoretical and finite element model plane, Waveform H (Equation 21).

Eddy Current Magnetic Force Production Mechanism and Analysis

Magnetic pole piece structures are used in SHTPMA and RTTPMA and IDMM of high mechanical strength and low conductivity. Such magnetic pole piece structures have both a high torque capability and can be employed in high torque machines whilst providing a means of benefit for eddy currents generated by pseudo ratio drive mechanisms through the use of flux gates in the IDMM and angular off-set of the pole pitch between the rotating SHTPMA and the RTTPMA controlled by an open loop program electric circuit. Typically as known in the art, eddy currents are wanted to be reduced as in typical architectures of electrical machines they are seen as a negative (Magnetic Pole-Piece Structure; International Publication Patent Number—WO 2009/138725 A2), as they are loss mechanisms and reduce systems efficiency. In the MAGTRAN apparatus the utility of flux gates and open loop electric control architecture through a static or dynamic rotating intermediary pole-piece disc (IDMM) to control magnetic flux paths provides a topology which is unique and novel to use eddy currents in a positive fashion and as a controller of torque density, speed and magnetic gear ratio. Eddy currents generated in the MAGTRAN apparatus forms the foundation of pseudo, hysteresis-eddy current variable drive (PHECVD) control and power transfer in electric machines. PHECVD creates a true hybrid magnetic motive force controller using eddy currents to create variable ratio magnetic gearing through manipulation of magnetic fluxes. It combines management and control of opposing eddy currents from rotating magnetic fields passing through the flux gating mechanism, which is driven by the primary hysteresis magnetic motive force from the rotating magnetic field of which eddy currents area by product thereof.

The expression relating the current in the SHTPMA to the electromagnetic force exerted on the RTTPMA through the IDMM and eddy currents passing through flux gates creating the differential electromagnetic energy stored in an air gap as depicted in Equation. 10 is given as the derivative equation:

$$dB/dt(x,y,t) = fi(t) \cos az2(z0+z) \cos h(ab) \quad 11.)$$

where "a" and "fi" are the conductivity and permeability of the pole-piece RTTPMA material, as governed by the normal flux flow of the eddy currents through the gap, between the pole pieces, over time. Equation (17) can be solved analytically for a bar whose length is long relative to its cross-sectional dimensions. When excited by a sinusoidally varying actuator coil current, (18) can be used to develop the boundary conditions for the sinusoidal wave flux constrained by the electric open loop actuator coil control circuit.

$$dw = \frac{1}{2} B^2 A / 2 U_O dz \quad 12.)$$

where $B = \phi/A$ is the flux density.

Figure 11:
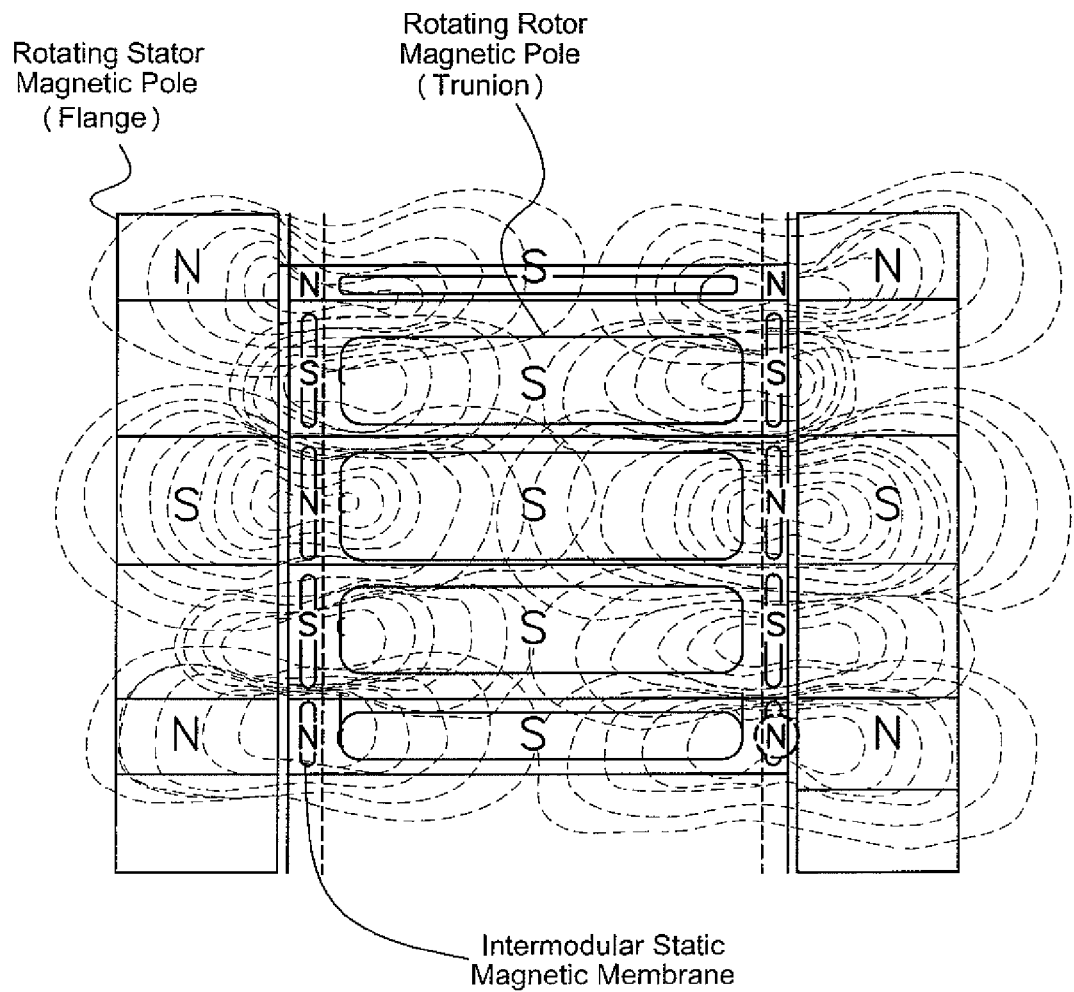
FIG. 11 is a conceptual plan view of the rotational magnetic field ratio and magnetic position topology with flux gates closed illustrating the relevant magnetic fields in accordance with the disclosure.
Figure 12:
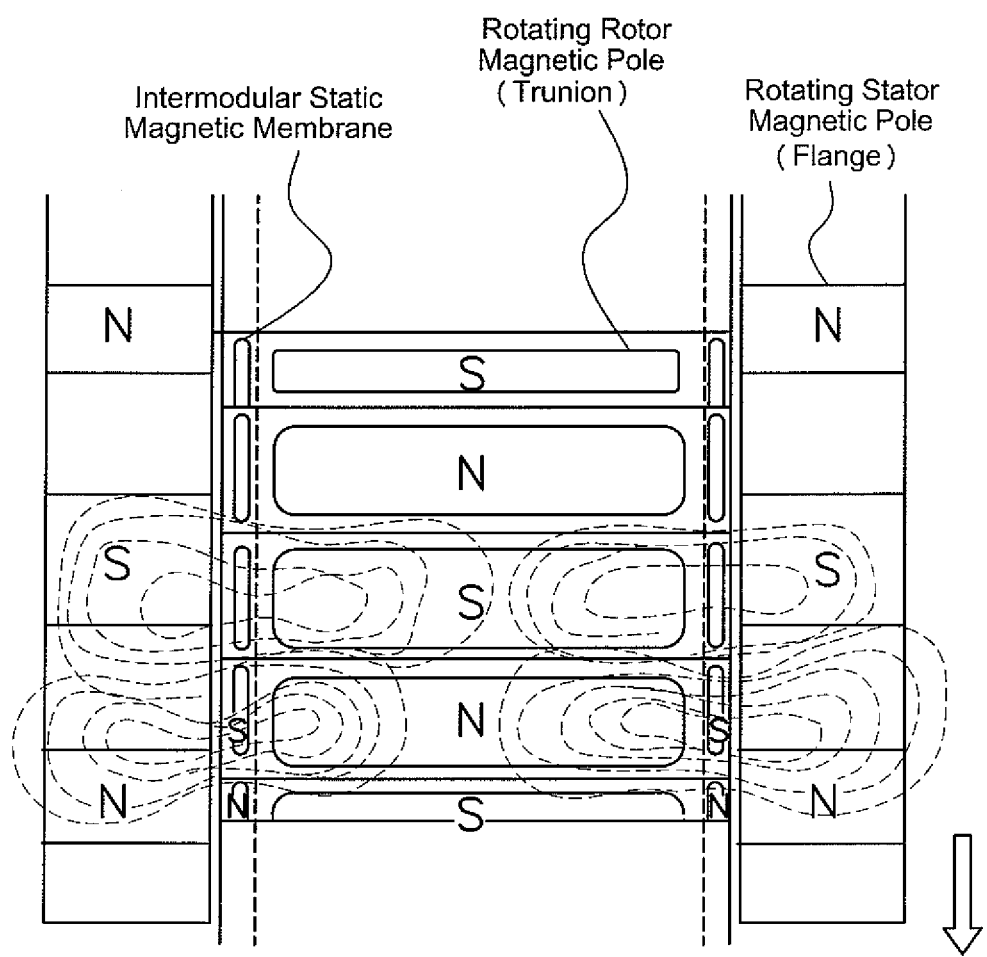
FIG. 12 is a conceptual plan view of the rotational magnetic field ratio and magnetic position topology with flux gates open illustrating the relevant magnetic fields in accordance with the disclosure.

From Newton's second law the differential energy between SHTPMA and RTTPMA can also be expressed as a force acting through a differential distance, FIG. 11:

$$dw = F_m d_z \quad 13.)$$

Figure 14:
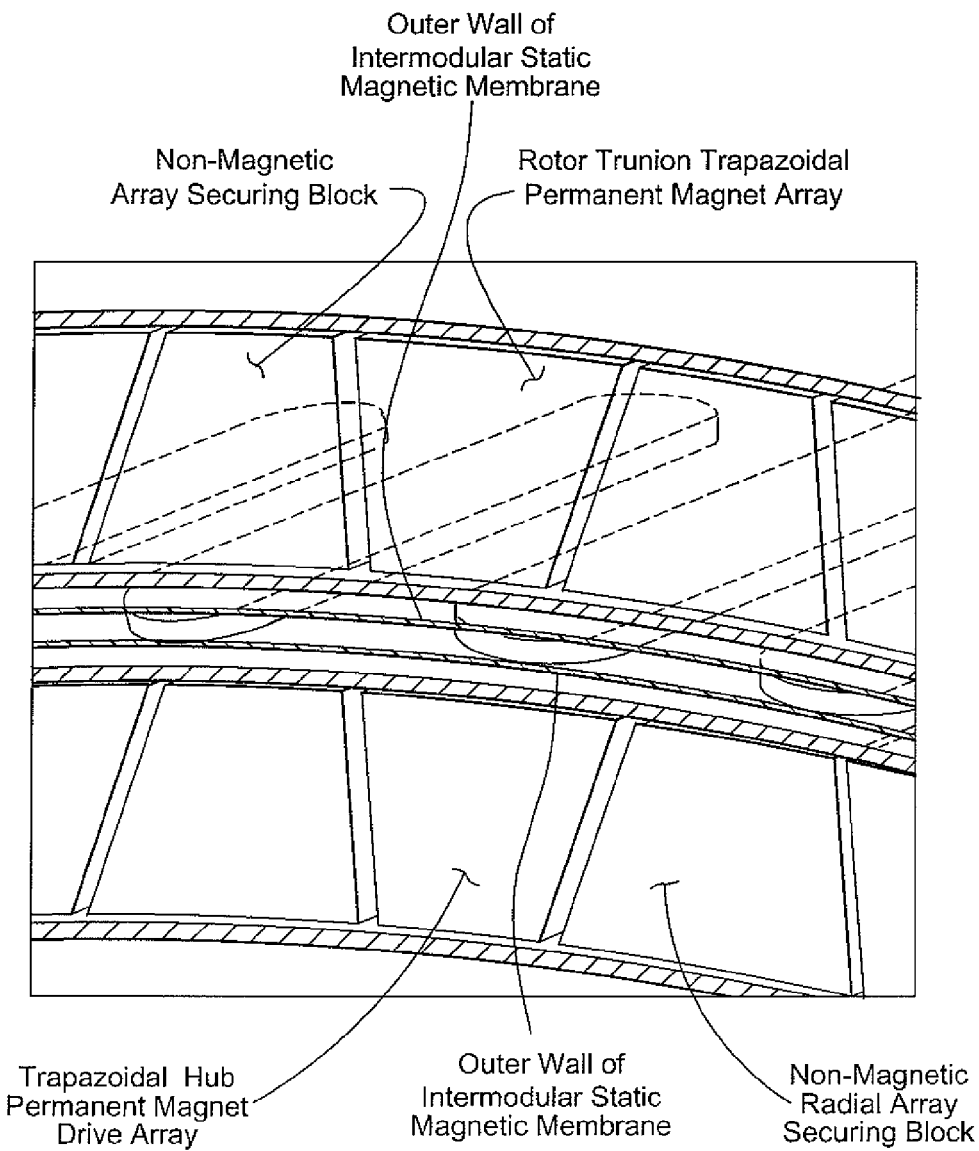
FIG. 14 is a conceptual, partially transparent perspective view of the engine of FIG. 1 the inner structural wall of the stator hub in accordance with the disclosure.

Combining (10) and (11) and accounting for the presence of two air gaps, the attractive forces shown in FIG. 14 are:

$$F_{M1} = B^2_1 A / U_O \quad 14.)$$

The current induced by the SHTPMA across the two air gaps into the RTTPMA through the IDMM is constant, therefore the flux it produces is constant, in both space and time, and no eddy currents are induced in the pole-pieces across the IDMM. As rotation occurs of the high speed rotor, or SHTPMA, and the angular offset increases or reduces between the pole pieces of the IDMM, as determined by the magnetic ratio requirement and in relation to the desired slower RPM of RTTPMA, the majority of the drop occurs in the air gaps, the magnetic flux relationship can be used to express the flux density in terms of the permanent magnet current field, therefore the flux densities in the two magnetic circuits between the SHTPMA and IDMM at any given angular offset, keeping θ constant (angle of offset θ and r as the rate of change being equal) can then be written as:

$$B_1 = \mu_0 Ni / 2(Z_o + Z) \quad 15.)$$

As the current in the permanent magnets changes with time, the eddy currents are induced in the IDMM pole-pieces. The eddy currents, in turn, produce the reactive flux in opposition to the original flux which is controlled electronically through an open loop servo controlled architecture. The result of the superposition of the two effects is a reduced net flux in the IDMM pole-pieces, increased flux in the SHTPMA and subsequent torque increase or decrease (as controlled through the open loop electronic architecture), through the eddy-current flux via the IDMM based on the input from flux-path manipulation. The resultant spatial flux distribution in the pole-piece in a plane orthogonal to the flux direction is governed by the following derived diffusion-type equation:

$$\delta^2 B(y,x,t)/\delta x^2 + \delta^2 B(x,y,t)/\delta y^2 = \sigma\mu[\delta B(x,y,t)]/\delta t \quad 16.)$$

where σ and μ are conductivity and the permeability of the IDMM pole pieces. The eddy currents are caused in the core as flux flows through the magnetic core blocks of SHTPMA and into the IDMM, it is written numerically in the differential expression:

$$I_{ed} = g_{ed} d\phi_{ed}/dt \quad 17.)$$

Where $g_{ed}$ is the conductance of the eddy current path, which is determined by the geometry of the magnetic core blocks in the SHTPMA, and the path through the flux gates of the IDMM, and $\phi_{ed}$ is the flux linked to the eddy current, with the magnetic core blocks represented by the equivalent circuit in figure. Equation (17) can be solved analytically for a magnetic trapezoidal PM bar whose length is long relative to its cross-sectional dimensions. When excited by a sinusoidally varying actuator coil current, then:

$$i_1(t) = I_1 \cos az \qquad 18.)$$

And then (12) and (15) can be used to develop the following boundary conditions for flux path conductivity at the flux gate IDMM pole pieces, therefore:

$$B_I(x,y)1x+/-a, y+/-b = \mu_\theta H I_1/2(Z_0+Z) \qquad 19.)$$

Figure 15:
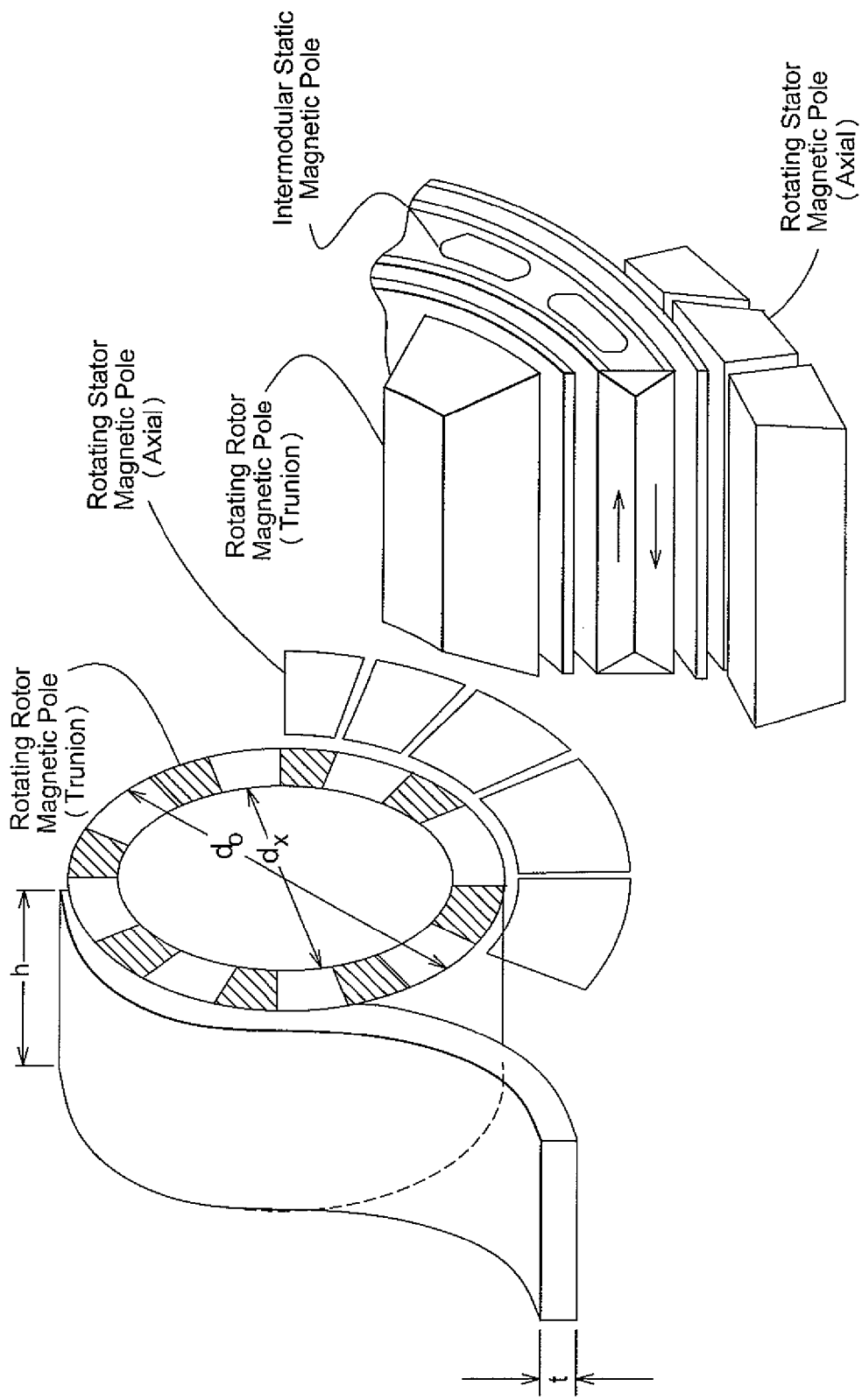
FIG. 15 is a conceptual view of a single stage stator drive gear array with permanent magnet structure topology.

Subject to this boundary condition, (19), wave forms with and without influence of eddy currents are transposed to propel the low speed gear faster, or slower, as the flux gates approach maximum angular offset, or minimum angular offset, between the faster rotating SHTPMA, the slower moving IDMM, and the slower or faster RTTPMA, where the entry point for the eddy currents traveling at a 90 degree offset to the SHTPMA poles, parallel to the IDMM pole fluxes and offset by the angular momentum of the flux paths between the IDMM poles as depicted in FIG. 15B where angular offset against "cosine pie" is shortened, eddy flux is reduced against angular offset 8, as it lends to the slowing of RTTPMA, or speeding up of the RTTPMA, in relation to SHTPMA its source, through influence and alignment of flux paths between the two, rotor or stator, and eddy currents passing or not dependent on the alignment of the paths, hence electromagnetic braking or not, and hence the differential ratio ability. The confluence of the passing of the eddy currents through the flux paths or gates is controlled by the open loop electric circuit engaged at the interface of the IDMM and the RTTPMA at the appropriate air gaps between them.

The boundary condition is expanded upon in a time reference dt/dB and the integral over time of eddy current flux strength dt/dH as a sinusoidal steady state solution to Equation 16, involving Equation 15 of two magnetic circuits in IDMM and RTTPMA is expressed as an expansion of Equation 16, whereby:

$$H = f(B); B = B_m \sin \theta \qquad 19.)$$

Then Equation 23 is:

$$B_1 = \mu_o NI/2(z_o+z)[\cos h(\alpha y)/\cos h(\alpha b) + \Sigma_K^\infty P_K \cos (k\pi y/2b) \cos h(x\sqrt{B_k})]$$

With numerical assumptions of Equation 20 where:

$$H_1 = A_1 \sin \theta + A_3 \sin \theta + \ldots B_o \cos \theta + B_2 \cos 3\theta \ldots \text{ as a polynomial}$$

And

Equation 21 provides the waveform constraint for IDMM as derivative function;

$$H = a_1 B + a_3 B^3 + \ldots (b_o + b_2 \cos B^2 + \ldots) dB/d\theta$$

And then:

$$B = \phi/A$$

φ=flux in the magnetic open circuit
A=area of the pole piece normal to the flux direction
$B_i(x,y,z,w)$=is a complex number representing the magnitude and phase of the flux density in the pole-piece.

The normalized magnitude of (z,y,z,u) is plotted in FIG. 19, with z-0 and w=10 rad/sec. The figure exemplifies how the effect of eddy currents Normal to the magnetic field can depress the magnitude of the flux in that field and creating magnetic drag (or conversely magnetic acceleration when the flux gate is closed due to angular offset between the IDMM and RTTPMA) occurring in the central regions of each pole-piece.

In order to exemplify a simple, frequency dependent model of the force produced by the eddy "electric actuator" current, the flux density as given by Equation 23, is averaged over pole-piece face area yielding equation 26.

The frequency response of BI (z,w) is expected to be dominated by the $1/\alpha$ tan h ($\alpha$) term in Equation 26, and a log magnitude between and 40 deg phase lag and 43 deg phase lag at high frequencies due to the Joule factor in the "$\alpha$" term is prevalent. Substituting the spatially averaged flux density, as given by (26), for the constant flux density, $B_i$, in the Force Equation, Equation 14, proposes the following frequency dependent approximation for the magnetic force produced by a time-varying current from the open control loop electronic circuit into the eddy current flux at the flux gate giving a method to electronically control the magnetic ratio, or magnetic drag, or acceleration here with. A similar analysis yielding a similar expression for the force produced by the electric open loop actuator field at the flux gate of IDMM, is presented in Equation 27.

The boundary condition for all of SHTPMA involves all $B = \int_k^\infty (\phi/A)$, the flux in the magnetic pole piece across the surface area of one IDMM pole governing all eddy currents in H, the magnetic flux influence through the air gap based on the actuator coil circuit open loop influence, B of Pk as in the wave form H, over angular offset π, and the boundary condition (x, y, z, w), where W is Normal to RTTPMA flux path.

To obtain the constraining force equation along any given time of the RTTPMA at the flux gate for a single IDMM pole piece, for any given $P_1$, summation part of $B_1$ is:

$$P = 4\alpha^2(k\pi/2)^{k-1}/k\pi Bk \cos h(\alpha \sqrt{Bk})$$

For Equation 24, substituting B gives: $(\int g_{-even}^{B+1} \int_{-odd}^{1/B-1})$ Where for $P_1$ summation part of $B_1$ is Equation 25:

$$P = \pi y^{1-x}/\pi(B_m \sin \theta) 4 \sin(\cos 2^b)$$

Additionally eddy currents are normal to the magnetic flux and field, and the ability to act as MAGTRAN ratio adjustment fields through the flux gates is a frequency dependent model of the electromagnetic force impeded upon the flux gate from the open loop electric circuit where Equation 25 is rearranged through examining tangent forces derived in Equation 23 where:

[cos $h(\alpha,y)/\cos h(\alpha,y)] + [k^\infty P_k \cos \ldots$ is averaged over the pole piece area yielding Equation 26 where:

$$B_{1(Z,W)} = \mu_o NI_1/4ab(z_o+z)[1/\alpha \tan h(\alpha b) + (4\alpha/\pi)^2 b \\ (\pi y^{1-x}/\pi((B_m \sin \theta) 4 \sin (\cos) 2^b))$$

The frequency response of $B_{1(Z,W)}$ Equation 26 is dominated by the, tan h ($\alpha$b), term, and log-magnitude, and phase plots may reveal the high frequency roll-off of approximately 10 dB/decibel and 43 degrees of phase lag at high frequencies due to the $\sqrt{jw}$ factor in the a term. Substituting average flux density at the flux gate(s), or plurality thereof, as in the IDMM magnetic topology and geometric architecture, as given by Equation 26, constant flux density $F_{m1}$, the force equation (Equation 14),
yields Equation 27.

$$F_{2(Z,W)} = \mu_o N^2/A(I_2/z_o+z)^2[1/\alpha \tan h(\alpha b) + \pi y^{1-x} b(\pi y^{1-x}/\pi((B_m \sin \theta) 4 \sin(\cos 2b))$$

Substituting the spatially averaged flux density for SHTPMA and the boundary condition, as given in Equation 27, for the constant flux density, $F_{m1}$, in the Force equation (Equation 14), this yields the following frequency dependent approximation for the magnetic force produced by the eddy current at the pole piece(s) of the IDMM, which yields the frequency dependent approximation for the magnetic force time dependent current, Therefore Equation 28:

$$F_{2(Z,W)} = \mu_o N^2/A(I_2/z_o+z)^2 [1/\alpha \tan h(\alpha b)+(4\alpha/2 \pi y)^2 B_m - P(\pi y^{2-x}/\pi((B_m \sin \theta)4 \sin(\cos 2b))$$

Dependent on phase lag there is roll-off and decay of the magnetic force at the pole piece(s) near the gate in the rotating elements of IDMM and RTTPMA, this is to be accounted for with design function of the IDMM pole piece array to maximize a steady state magnetic flux condition and which is exhibited in the constraining function of Equation 28 for equating the magnetic force, $F_2$, may be written in such as form so as to numerically describe the function in the necessary steady state magnetic force condition, which is a sinusoidal condition (see FIG. 7) at the IDMM interface with the flux gate path exemplified as a function response model written as Equation 29. This depicts numerically the steady state condition, $J_w/J_b$, and, P of addition $B_m$. While the break in frequency is described by the function $W_b$, it is closely related to the "$\sigma\mu$" product, an optimal value that can be obtained, and is significant enough to effect RTTPMA and hold it in a steady state condition although impacted by the phase lag flux of the rotating IDMM and subsequent sinusoidal magnetic conditions which are designed to offset in the design condition and constraint equation (29). Varying it as a geared ratio influx upon the steady state field is done for transmission ratio control where the steady state is broken intermittently through the manipulation from the open loop circuit, IDMM is removed from steady state condition and counters phase lag influence, and magnetic decay dependent relative to the rotational magnetic position of the flux gate to IDMM. The value condition of the frequency break to the steady state condition of the normal flux of eddy currents against the magnetic flux influence of the driver (stator-SHTPMA) to the rotor (RTTPMA) in MAGTRAN is defined in an optimal value with assumptions to $W_b$ as a non-influential constant. The frequency domain expression of the magnetic forces of IDMM at the pole interface with the fluxgate are further supported by this notion and expressed in Equation 29 by "i" and P of $jw_b$.

$$F_{m1} = \mu_o N^2/A(i_2/z_o+z)^2(1/i+j^{w/w}{}_b)(P+B_m) \qquad \text{Equation 29}$$

Frequency domain models of the response of magnetic forces to the flux gates in MAGTRAN driven by the sinusoidal steady state actuator current of the open loop control circuit is observed as equivalent time domain expressions numerically at the magnetic interface. FIG. 21, shows a first order type response with high frequency roll-off from the phase-lag of the angular off-set at the flux gate, at approximately 20 db/decade ("one decade" is a factor of 10 difference between two numbers, an order of magnitude measured on the logarithmic scale. It is especially useful when referring to frequencies and when describing frequency response of electronic and electromagnetic systems), with the phase lag at approximately 90 degrees. The response in a first order system, in relation to the time constant "$J_w$" is as follows.

$$F'(Jw_b) = (1/i+j^{w/w}{}_b)(P+B_m) \qquad \text{Equation 30}$$

To further the justification of these types of expressions as control constraints under steady state magnetic force conditions at the IDMM interface with the flux gate and eddy current control, they must take the right form numerically. This is done by replacing "jw", holding "i", z and P, with $B_m$ constant, taking inverse LaPlace Transforms, resulting in the first order differential equation below, Equation 31.

$$dF_m2/dt = -w_0 F_{m2} + (\mu_o N^2 A W_o/4)(i_2/z_o+z)^2(P+B_m) \qquad \text{Equation 31}$$

This equation describes the constant change in time for the magnetic flux force, $dF_m2/dt$, by the normal eddy current path at the flux gate, controlled by the open loop circuit adjacent to the rotating IDMM, the varying control driver of the RTTPMA.

Magnet Types for MAGTRAN

Most magnetic couplings and clutches are now made with high-energy rare-earth magnets. These fall into two categories: NdFeB (neodymium iron boron, also called simply neo) and SmCo (samarium cobalt.) SmCo has undergone improvements in recent years for increased power density. $SmCo_5$ designs are being replaced with $Sm_2Co_{17}$.

All magnets have some reversible field losses as well as irreversible losses with increasing temperature. At even higher temperatures (Curie temperatures) they lose all magnetic properties, and the magnetic fields become totally random. On a cubic-inch basis, NdFeB is stronger than SmCo for similar degrees of magnetization at room temperature. However, as temperature increases the NdFeB magnets become weaker faster than SmCo—0.1% per ° C. versus 0.03% per ° C. For NdFeB magnets, irreversible losses may occur starting at 120° F. (for standard grades) vs. 150° C. for high-temperature UH and EH grades. Usually for applications over 200° F., SmCo is used for its more constant torque rating over all temperatures.

Some older products and lower power density designs (in other words, those requiring larger volume) include ceramic or AlNiCo. These magnets are less expensive per cubic inch. However, it must be noted that AlNiCo magnets (made from an alloy of aluminum nickel and cobalt) used in the very earliest synchronous couplings are prone to demagnetization and must be carefully applied.

Vibration is induced in permanent magnet DC motors and generators by traveling magnetic forces. Neodymium and other rare earths have greater retentivity, coercive force and maximum energy product than traditional ferrite magnets. Therefore, since the magnetic force increases approximately with the square of magnetic flux, the forces arising from MAGTRAN designs, and the SHTPMA, RTTPMA and IDMM topologies using rare earth magnets are maximized and optimized, and magnetic forces are significantly greater than those from conventional magnetic gear transmission magnet designs, and furthermore unique and novel to aero gas turbine transmissions which have been driven mechanically for over eighty years.

In the past researchers have analytically predicted the flux density in electric permanent magnet machines. Calculations for the magnetic force using the finite element method are common, with also the finite difference method determining the dynamic reaction with FEM, providing good examples of analysis to determine field strength. It has been shown through research that driving magnetic frequencies may be characterized by mathematical Fourier decomposition of magnetic traction. Additionally, it has been demonstrated that the vibration levels generated could be reduced by proper shaping of the magnets and the potential influence of low frequency modulation fields from electric circuits. Also, in addition it has been shown by researchers that the composition of the frequency spectrum can be shifted to higher frequencies to reduce the overall transmission of vibrations to the base system. The transmissibility of the higher frequencies are low except when the structural resonance occurs and this is dependent on topology of the magnetic drive or motor in question, transmissibility of low frequencies provides higher probability of influence upon controlling magnetic vibration anomalies. Research in the past has shown vibration reduction could be effected by interlacing higher energy magnets and slightly changing the magnetic orientations at the pole transitions or by the interlocking of the magnets. In the case of the invention, the electromagnetic segmented high torque density gas turbine engine transmission design describes innovative structural topologies which address the demand for high frequency operation, magnetic field vibration reduction, thus providing consistent, high speed, high torque density operation.

Typically two dimensional finite element analysis of electrical machines have been reported, but three dimensional finite element analysis of electrical DC machines has not been reported in details, and more specifically no development or research has ever been concerned with, or done on development, of a more efficient power transmission for aero gas turbines such as described in the invention. In this discussion, the characteristics of torque density, magnetic force acting on the rotor, shear gap strength and variation of that shear gap to provide a variable speed aero gas turbine magnetic transmission are analyzed and discussed. Jn the MAGTRAN apparatus a 3-dimensional analysis approach is quantified and discussed, which then in turn describes the topology and geometry architecture of the segmented aero gas turbine magnetic transmission, its structure, and electromagnetic control. The magnetic force analysis in the stator of the MAGTRAN transmission is similar, and is defined along with geometry and varying pole count, as it relates to the anticipated and quantified power transfer requirement of each turbine stage to the rotor, whether for the dual counter rotating bypass fan and integrated generator, the segmented, multi-stage counter rotating electrical compressor, or the multiple segmented power generation turbine Definition of the flux density defines the geometry of the magnets and positioning of them on the magnetic shaft (stator), as well as the intermediate electromagnetic field shaping conductor, its shape and position, in the invention; what is termed the static intermodular magnetic membrane. Flux density also defines the permanent magnets, their geometry in the trunions of the dual, counter rotating, bypass fan blades with integrated generator, or electric compressor, or power turbine, and the positioning of the integrated generator (superconducting or synchronous permanent magnet machine) as it relates to the rotating permanent magnets of the stator. Additionally, flux density metrics from analysis define the positioning of the permanent magnets on the shaft and their geometry and alignment with compressor blade trunions and turbine blade trunions with the integrated generator. The context of design setting structure is evaluated may be evaluated with finite element methods and the Maxwell stress tensor method to set the architecture and the electromagnetic topology of the MAGTRAN apparatus. Also the component and the characteristics of the magnetic force and magnetic torque are such that they define the overall geometry of the magnetic transmission and its rotating turbomachinery components about it, using a cylindrical coordinate system for the aero gas turbine stator magnetic shaft components.

Having described herein illustrative embodiments of the disclose concept, persons of ordinary skill in the art will appreciate various other features and advantages thereof apart from those specifically described above. It should therefore be understood that the foregoing is only illustrative of the disclose principles, and that various modifications and additions can be made by those skilled in the art without departing from the spirit and scope of the invention. Accordingly, the appended claims shall not be limited by the particular features which have been shown and described, but shall be construed also to cover any obvious modifications and equivalents thereof.

What is claimed is:

1. An electrical machine apparatus comprising:
A) a moveable rotor having a first magnetic field associated therewith;
B) a stator configured with a plurality of stationary stator windings therein; and
C) a magnetic flux modulator interposed between the moveable rotor and the stator windings,
wherein the magnetic flux modulator is configured to transmit torque between the first magnetic field associated with the moveable rotor and a second magnetic field through the movable stator.

2. The apparatus of claim 1 wherein the magnetic flux modulator comprises a plurality of axially arranged magnetic flux gates with their magnetic field excitable by, and controllable by, eddy currents normal to the field through the plurality of stationary stator magnets as governed by a position of the magnetic flux modulator rotating relative to the stator and movable rotor.

* * * * *